US012536744B2

(12) United States Patent
Dasher et al.

(10) Patent No.: US 12,536,744 B2
(45) Date of Patent: Jan. 27, 2026

(54) METHODS AND SYSTEMS FOR COLLABORATIVELY SCANNING AN ENVIRONMENT

(71) Applicant: Adeia Guides Inc., San Jose, CA (US)

(72) Inventors: Charles Dasher, Lawrenceville, GA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 115 days.

(21) Appl. No.: 18/541,700

(22) Filed: Dec. 15, 2023

(65) Prior Publication Data

US 2025/0200885 A1    Jun. 19, 2025

(51) Int. Cl.
| | |
|---|---|
| *G06T 17/05* | (2011.01) |
| *G01C 21/36* | (2006.01) |
| *G06T 7/11* | (2017.01) |
| *G06V 10/44* | (2022.01) |
| *G06V 10/764* | (2022.01) |

(52) U.S. Cl.
CPC .......... *G06T 17/05* (2013.01); *G01C 21/3635* (2013.01); *G06T 7/11* (2017.01); *G06V 10/44* (2022.01); *G06V 10/764* (2022.01); *G06V 2201/07* (2022.01)

(58) Field of Classification Search
CPC .......... G06T 17/05; G06T 7/11; G06V 10/44; G06V 10/764; G06V 2201/07; G01C 21/3635
See application file for complete search history.

(56) References Cited

U.S. PATENT DOCUMENTS

| | | | |
|---|---|---|---|
| 8,818,768 B1 | 8/2014 | Fan et al. | |
| 9,536,352 B2* | 1/2017 | Anderson | .......... G06K 17/0016 |
| 11,436,808 B2* | 9/2022 | Wang | ........................ G06T 7/11 |
| 11,922,368 B1 | 3/2024 | Wozniak et al. | |
| 12,039,735 B2* | 7/2024 | Feng | ........................ G06T 7/168 |
| 12,112,435 B1 | 10/2024 | Bhushan et al. | |
| 2009/0237396 A1 | 9/2009 | Venezia et al. | |
| 2013/0083064 A1 | 4/2013 | Geisner et al. | |
| 2013/0242113 A1* | 9/2013 | Tanaka | .................. H04N 23/61 |
| | | | 348/169 |
| 2014/0198096 A1* | 7/2014 | Mitchell | ................ G06F 3/147 |
| | | | 345/419 |

(Continued)

OTHER PUBLICATIONS

U.S. Appl. No. 18/541,711, filed Dec. 15, 2023, Charles Dasher.

(Continued)

*Primary Examiner* — Abderrahim Merouan
(74) *Attorney, Agent, or Firm* — HALEY GUILIANO LLP

(57) ABSTRACT

There are provided systems and methods for scanning objects in a virtual environment. In particular, the present disclosure pertains to the domain of three-dimensional (3D) object capturing in extended reality (XR) environments and to an optimized system and method for passively capturing 3D objects within Extended Reality (XR) environments. A selection of an object from within an XR environment by a user via a user device is detected. A 3D capture session is initiated based on the detection. Scan data corresponding to the selected object is captured during the 3D capture session, where the capturing is performed as a background process on the user device. A 3D representation or model of the object is generated in the XR environment and provided to the user via the user device.

20 Claims, 17 Drawing Sheets

(56) References Cited

U.S. PATENT DOCUMENTS

| | | | |
|---|---|---|---|
| 2014/0226858 A1 | 8/2014 | Kang et al. | |
| 2017/0154204 A1 | 6/2017 | Ryu et al. | |
| 2017/0169619 A1 | 6/2017 | Mullins | |
| 2018/0114363 A1* | 4/2018 | Rosenbaum | G06T 15/04 |
| 2020/0035025 A1 | 1/2020 | Crocker et al. | |
| 2020/0053253 A1 | 2/2020 | Kavallierou | |
| 2020/0080853 A1* | 3/2020 | Tam | G08G 1/22 |
| 2021/0209339 A1* | 7/2021 | You | G06V 10/454 |
| 2021/0326777 A1* | 10/2021 | Stevens | H04L 63/123 |
| 2022/0277543 A1 | 9/2022 | Saklatvala | |
| 2023/0368458 A1 | 11/2023 | Dryer et al. | |
| 2023/0419616 A1 | 12/2023 | Dudovitch et al. | |
| 2024/0104132 A1 | 3/2024 | Banfield et al. | |
| 2024/0265654 A1 | 8/2024 | Tomizuka et al. | |
| 2024/0290049 A1 | 8/2024 | Prideaux-Ghee et al. | |
| 2025/0005867 A1 | 1/2025 | Reynolds et al. | |
| 2025/0078401 A1 | 3/2025 | Biswas et al. | |
| 2025/0200875 A1* | 6/2025 | Dasher | G06V 10/44 |
| 2025/0200885 A1* | 6/2025 | Dasher | G06T 17/05 |

OTHER PUBLICATIONS

Abou-Chakra, J., "Scene Understanding, Semantic SLAM, Implicit Representations", In Conference on Robot Learning, available online at: <https://nikosuenderhauf.github.io/projects/sceneunderstanding/>, retrieved on Nov. 27, 2024, 10 pages.

Anonymous, "Are Online Trade Schools Worth It?," (https://www.onlineschoolscenter.com/are-online-trade-schools-worth-it/) (downloaded Aug. 14, 2023; undated) (18 pages).

Anonymous, "Room scan visualization," Microsoft, Sep. 21, 2022 (https://learn.microsoft.com/en-us/windows/mixed-reality/design/room-scan-visualization) (3 pages).

Anonymous, "Scanning and detecting 3D objects," Sample Code, (https://developer.apple.com/documentation/arkit/arkit_in_ios/content_anchors/scanning_and_detecting_3d_objects) (downloaded Aug. 14, 2023; undated) (7 pages).

Apple Developer, "Augmented Reality—Object Capture", Apple Developer, "Augmented Reality—Object Capture" (Downloaded Mar. 15, 2024) Retrieved from https://developer.apple.com/augmented-reality/object-capture/ (2 pages).

Burgess, "Tour the British Museum on Google Street View," Wired (Dec. 11, 2015) (https://www.wired.co.uk/article/british-museum-google-street-view) (7 pages).

Chen et al., "An Overview on Visual SLAM: From Tradition to Semantic," Remote Sensing, MDPI, 14:3010 (May 29, 2022) (47 pages).

Chen, Zhiqin, et al., "MobileNeRF: Exploiting the Polygon Rasterization Pipeline for Efficient Neural Field Rendering on Mobile Architectures", Chen, "MobileNeRF: Exploiting the Polygon Rasterization Pipeline for Efficient Neural Field Rendering on Mobile Architectures" (The Conference on Computer Vision and Pattern Recognition (CVPR), (2023) Retrieved from https://mobile-nerf.github.io/ (6 Pages).

Crawford, How to host a real estate virtual open house in 7 steps, Next (Jul. 9, 2020) (13 pages) (https://www.nextinsurance.com/blog/how-host-a-real-estate-virtual-open-house-in-7-steps).

Deci.AI, "The Ultimate Guide to Deep Learning Model Quantization and Quantization-Aware Training", Deci.AI, "The Ultimate Guide to Deep Learning Model Quantization and Quantization-Aware Training" (Downloaded Mar. 15, 2024) Retrieved from https://deci.ai/quantization-and-quantization-aware-training/ (8 Pages).

Edwards, Benj, "New AI model can "cut out" any object within an image-and Meta is sharing the code", Edwards, "New AI model can "cut out" any object within an image-and Meta is sharing the code" (2023), Retrieved from https://arstechnica.com/information-technology /2023/04/m eta-introduces-ai-m odel-that-can-isolate-and-mask-objects-within- images/ (7 Pages).

Kiri Engine, "Kiri Engine App", Kiri Engine, "Kiri Engine App", (Downloaded Mar. 15, 2024) Retrieved from https://www.kiriengine.app (7 Pages).

Lancial, Braxton, "The Basics: Niantic Lightship", https://lightship.dev/guides/lightship-basics/, 2022.

Mars Gadgets, "Free 3D Scanner Apps (Photogrammetry) 2022", Mars Gadgets, "Free 30 Scanner Apps (Photogrammetry) 2022" (Sep. 26, 2021) Retrieved from https://www.youtube.com/watch?v=K3PyUMOPI1M (12 Pages).

Matterport, "Get a 2D floor plan from a 3D tour.," (downloaded Sep. 13, 2023, https://matterport.com/how-it-works/schematic-floor-plans).

Neta Zmora et al., "Achieving FP32 Accuracy for INT8 Inference Using Quantization Aware Training with NVIDIA TensorRT", (Jul. 20, 2021), (https://deci.ai/quantization-and-quantization-aware-training/), 8 pages.

Niantic, "Lightship VPS: Building Our 30 Map From Crowdsourced Scans", Niantic "Lightship VPS: Building Our 30 Map From Crowdsourced Scans" (Nov. 10, 2022) Retrieved from https://nianticlabs.com/news/vps-part-2?hl=en (4 Pages).

NVIDIA Game Developer, "NVIDIA's Photogrammetry 'Live Visualizer' using Reality Capture and Unity", NVIDIA Game Developer, "NVIDIA's Photogrammetry 'Live Visualizer' using Reality Capture and Unity" (Mar. 9, 2017) Retrieved from https://www.youtube.com/watch?v=HofnsfF6Qgw (3 Pages).

Papers With Code, "3D Semantic Segmentation", Papers With Code, "3D Semantic Segmentation" (Downloaded Mar. 15, 24), Retrieved from https://paperswithcode.com/task/3d-semantic-segmentation (17 Pages).

Perez, "Apple Acquires Flyby Media, Makers Of Tech That "Sees" The World Around You," Join TechCrunch (Jan. 29, 2016) (9 pages) (Apple Acquires Flyby Media, Makers Of Tech That "Sees" The World Around You | TechCrunch).

Photogrammetry as defined by Wikipedia, https://en.wikipedia.org/wiki/Photogrammetry, retrieved from internet Oct. 3, 2023.

Roomvo, "Where imagination meets results," (downloaded Sep. 13, 2023; https://get.roomvo.com/product-room-visualizer-flooring/) (7 pages).

Weinmann et al., "Efficient 3D Mapping and Modelling of Indoor Scenes with the Microsoft HoloLens: A Survey," PFG, 89:319-333 (2021).

U.S. Appl. No. 18/214,776, filed Jun. 27, 2023, Jennifer Reynolds.

\* cited by examiner

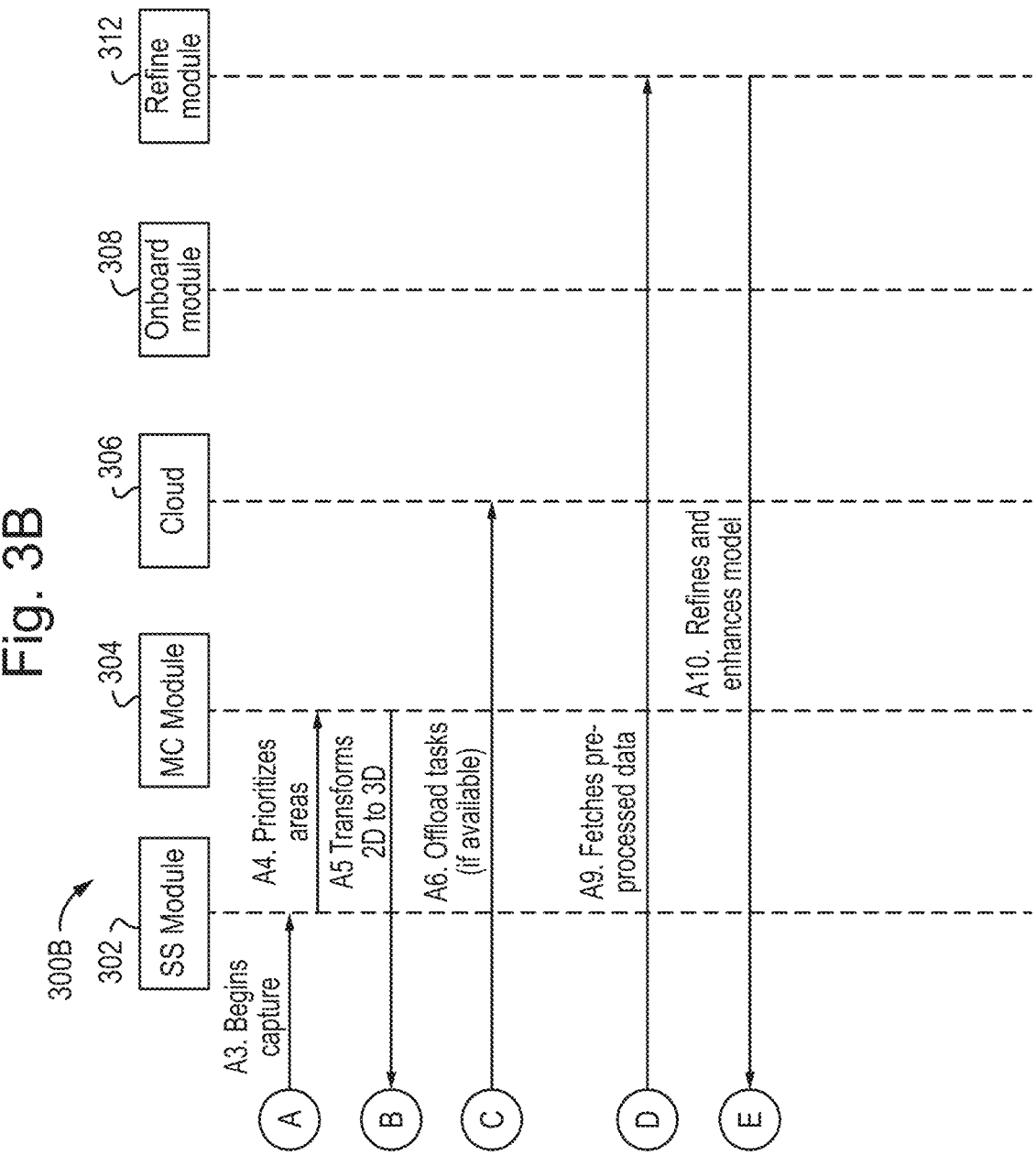

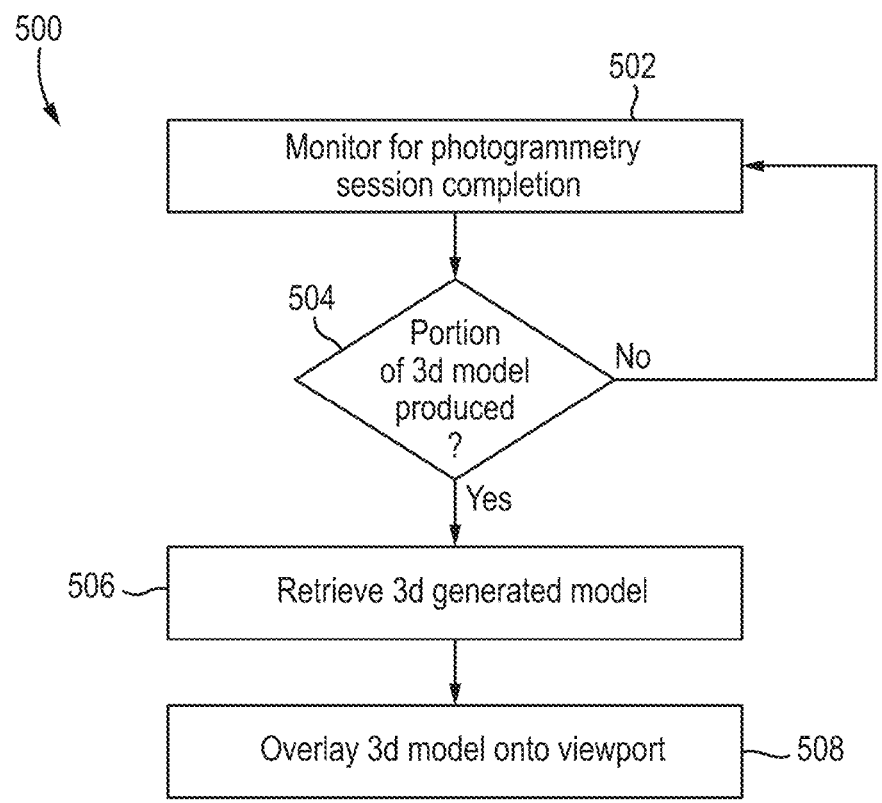

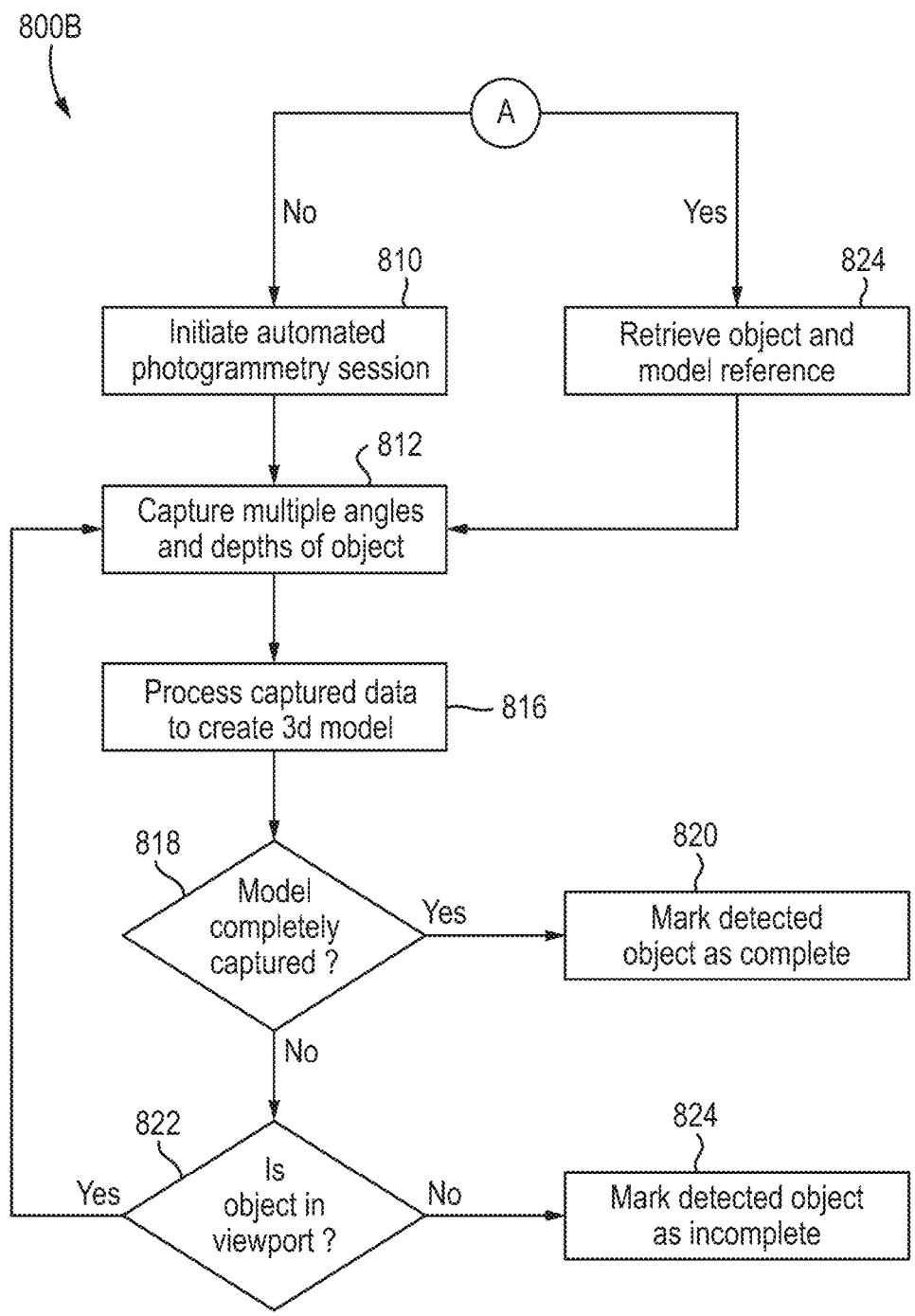

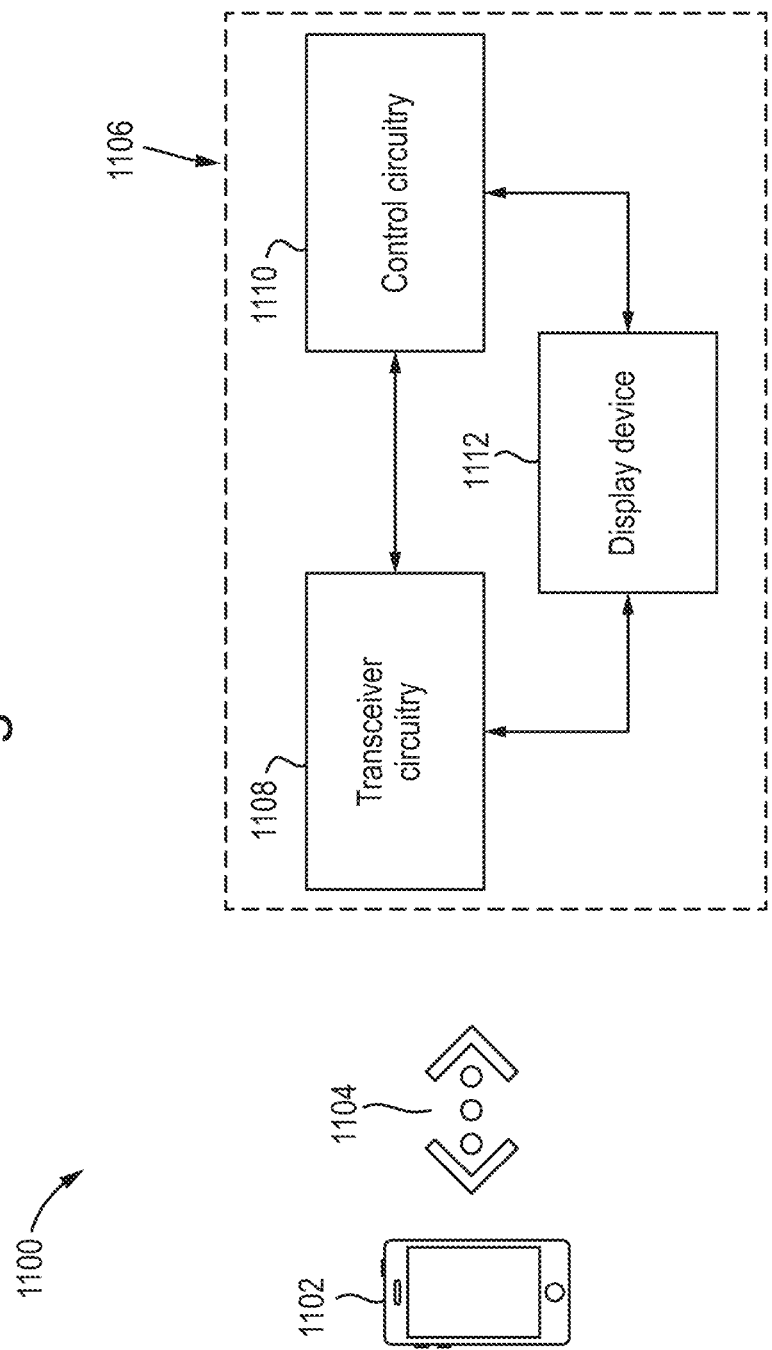

METHODS AND SYSTEMS FOR COLLABORATIVELY SCANNING AN ENVIRONMENT

FIELD

The present disclosure relates to methods and systems for scanning a physical object, and more particularly but not exclusively, to methods and systems for passively capturing objects in a virtual environment, for example, an extended reality (XR) environment.

BACKGROUND

Extended reality (XR), which encompasses virtual reality (VR), augmented reality (AR), and mixed reality (MR), has witnessed a rapid growth in recent years. Within XR environments, there has been an increasing demand for efficient capture and representation of real-world objects into digital three-dimensional (3D) models. Existing methods such as photogrammetry for 3D object capture typically require dedicated sessions and significant user interaction, often involving a multitude of different angles, distances, and lighting conditions. Such methods can be time-consuming and cumbersome for users, especially in dynamic environments or scenarios where immediate object capture is not feasible or practical.

Additionally, emerging technologies such as a neural radiance field (NeRF) often necessitate extensive computational resources, leading to excessive heat generation and rapid battery drain in devices, in particular, XR devices. These challenges are further exacerbated by the need for high-resolution models in certain applications.

Even with these 3D scanning technologies, the methods and systems require a user to focus their effort on scanning of an object of interest. Moreover, there are scenarios where a user may encounter an object of interest only briefly, or they only have the opportunity to capture a part of the object. In these situations, the conventional systems may or may not get a subsequent chance to complete or update the 3D model with additional data. While technologies like photogrammetry are being superseded by emerging techniques like NeRF, the way in which users initiate the scanning and capturing of objects of interest remains a manual process with users required to give attention to the process.

Given these challenges, there exists a need for a more adaptive and flexible method of 3D object capturing, while optimizing computational efficiency and battery consumption when an XR headset has access to cloud computing resources and when the XR headset operates independently.

Accordingly, systems and methods are disclosed herein to improve upon and further overcome the shortcomings of existing systems and methods.

SUMMARY

The present disclosure relates to methods and systems for scanning a physical object, and more particularly, to methods and systems for passively capturing objects in a virtual environment, for example, an XR environment.

In a first aspect of the disclosure, there is provided a method for scanning a physical object, the method comprising detecting, by the control circuitry, a presence of the physical object to be scanned, e.g., in an XR environment; initiating, by the control circuitry, a 3D scan of the physical object as a background operation of a user device; in response to the initiation of the 3D scan, capturing, by the control circuitry, scan data corresponding to the object while the object is in a field of view of the user device; storing, by the control circuitry, the scan data in a database; and generating, by the control circuitry, a 3D model of the physical object in the XR environment based on the scan data in the database. In some examples, the physical object to be scanned is detected when at least partially in a field of view of an imaging device, e.g., a camera of an XR device, such as an XR headset, and/or a sensor, such as a LiDAR sensor. In some examples, the scanning of the object occurs using the same imaging device used for the detecting. In some examples, the scanning of the object occurs using a different imaging device used than that used for the detecting.

In some examples, the method further comprises initiating a primary 3D scan of the physical object as a background operation of the user device; based on the primary 3D scan data, determining that a 3D model related to the physical object is incomplete; retrieving the 3D model related to the physical object from the database; and updating the retrieved 3D model with the scan data.

In some examples, in response to detecting the presence of the object, the method further comprises: displaying an assistive user interface element around the object within the viewport of the user device to capture a plurality of angles of the object in a 3D space.

In some examples, the method further comprises determining completion status data for the generation of the 3D model; generating an overlay comprising the 3D model of the object based on the completion status data; and displaying the overlay within the viewport of the user device. In some examples, the method further comprises aligning the scanned object to an orientation and a location of the physical object in the physical environment. In some examples, the method further comprises displaying within the virtual environment, the 3D model adjacent to the object in the physical environment In some examples, generating the 3D model further comprises applying spatial segmentation on the scan data corresponding to the object; identifying a portion of the object based on the spatial segmentation; and storing one or more portions in the database.

In some examples, the method further comprises highlighting the 3D model based on a set of user preferences.

In some examples, the method further comprises receiving an indication of priority for scanning one or more of a plurality of objects; and capturing said each of the plurality of objects based on the indication of priority.

In some examples, the method further comprises generating a digital twin of the physical environment including the plurality of objects in the virtual environment.

In some examples, the method further comprises tracking a motion of the object in the physical environment; and capturing the scan data corresponding to the physical object based on a speed of the motion of the object, wherein the scan data is captured when the speed of the motion is within a pre-defined threshold.

In some examples, the method further comprises generating reward data for the user to facilitate capturing of the plurality of objects.

In some examples, generating the 3D model further comprises receiving a set of features of interest corresponding to the physical object, and generating the 3D model based on the set of features of interest.

In some examples, generating the 3D model further comprises extracting a set of features corresponding to the object based on the capturing of the scan data, and generating the 3D model based on the set of features.

In some examples, the method further comprises evaluating one or more differences between a prior 3D model and the scan data corresponding to the physical object captured, and updating a set of features corresponding to the object based on the one or more differences.

In some examples, the method further comprises detecting one or more objects similar to the physical object, and capturing the one or more similar objects based on a set of user preferences.

In some examples, the method further comprises creating at least one classifier algorithm based on the scan data of the physical object; and using the classifier algorithm to detect a presence of a second physical object.

In some examples, the method further comprises, in response to detecting the presence of the physical object, extracting features from the scan data of the physical object; calculating a confidence score based on the extracted features from the scan data; in response to the confidence score being above a threshold, verifying the physical object for continued scanning; and in response to the confidence score being below a threshold, preventing the scanning of the physical object.

In a second aspect of the disclosure, there is provided a system for scanning a physical object, the system comprising control circuitry configured to: detect a presence of the physical object to be scanned in an extended reality environment; initiate a 3D scan of the physical object as a background operation of a user device; in response to the initiation of the 3D scan, capture scan data corresponding to the object while the object is in a viewport of the user device; store the scan data in a database; and generate a 3D model of the physical object in the extended reality environment based on the scan data in the database.

In a third aspect of the disclosure, there is provided a non-transitory computer-readable medium having instructions encoded thereon which, when executed, cause control circuitry to carry out a method, the method comprising: detecting, by the control circuitry, a presence of the physical object to be scanned in an extended reality environment; initiating, by the control circuitry, a 3D scan of the physical object as a background operation of a user device; in response to the initiation of the 3D scan, capturing, by the control circuitry, scan data corresponding to the object while the object is in a viewport of the user device; storing, by the control circuitry, the scan data in a database; and generating, by the control circuitry, a 3D model of the physical object in the extended reality environment based on the scan data in the database.

In a fourth aspect of the disclosure, there is provided a method for collaboratively scanning an environment, the method comprising: receiving first scan data of an environment captured from a first user device associated with a first user profile as a background operation of the first user device; receiving second scan data of the environment captured from a second user device associated with a second user profile as a background operation of the second user device; storing the first and second scan data in a database; generating a 3D map of the environment by extracting one or more features from the first and second scan data; determining a portion of the 3D map created with the features extracted from the first user device and rewarding the first user profile a portion of a reward based on the portion of the 3D map created with the features extracted from the first user device; and determining a portion of the 3D map created with the features extracted from the second user device and rewarding the second user profile a portion of a reward based on the portion of the 3D map created with the features extracted from the second user device.

In some examples, the method further comprises analyzing the first and second scan data to identify a change in a region of interest in the 3D map; extracting features from the scan data corresponding to the change in the region of interest; and updating the 3D map with the extracted features.

In some examples, the method further comprises detecting one or more objects from the scan data based on a frequency of occurrence of the one or more objects in the scan data; generating a priority for scanning the one or more objects based on the frequency of occurrence; and wherein the portion of the reward is further based on the priority of the one or more objects.

In some examples, the method further comprises instructing the first and second user devices to capture scan data as a background operation corresponding to the priority of the one or more objects, while the one or more objects are within a viewport of the user device.

In some examples, the method further comprises displaying an assistive user interface element around one or more objects within the viewport of the first or second user device to aid in the capture of additional scan data of the one or more objects.

In some examples, the method further comprises determining completion status data for the generation of the 3D map; generating an overlay comprising the 3D map on the environment; and displaying the overlay within the viewport of the user device.

In some examples, the method further comprises generating a digital twin of the physical environment based on the 3D map and scan data.

In some examples, the method further comprises receiving a request for navigation from a first point of interest to a second point of interest in the environment; generating a navigation route in the digital twin of the physical environment; and providing navigation instructions to a user device from the first point of interest to the second point of interest.

In some examples, the method further comprises updating the real-time navigation instruction to the user device based on the movement of the user device through the digital twin environment.

In some examples, the method further comprises applying spatial segmentation on the scan data corresponding to the environment; identifying a portion of the environment based on the spatial segmentation of the environment; and receiving scan data corresponding to the portion of the environment; wherein the 3D map of the environment is updated based on the scan data corresponding to the portion.

In some examples, the method further comprises creating at least one classifier algorithm based on the scan data of the environment; and using the classifier algorithm to detect a presence of a physical object in the environment.

It should be noted that examples of the first aspect are compatible with examples of the second to fourth aspects unless explicitly stated otherwise.

Accordingly, there are presented herein methods and systems for passively capturing objects and an environment. The present disclosure focuses on 3D capturing within Extended Reality (XR) environments, introducing an optimized system and method for passive 3D scanning. Unlike traditional methods, the present disclosure does not demand user focus on objects during scanning, allowing scanning to occur in the peripheral view of XR devices. The present disclosure prioritizes user experience by operating 3D scanning as a background process, minimizing heat generation and battery usage.

BRIEF DESCRIPTION OF THE DRAWINGS

Examples are further described hereinafter with reference to the accompanying drawings, in which:

FIGS. 3A and 3B illustrate a sequence diagram for implementing a proposed system, in accordance with some examples of the present disclosure;

FIG. 5 illustrates a flowchart of an example method of generating an overlay of a 3D model, in accordance with some examples of the present disclosure;

FIGS. 8A and 8B illustrate a flowchart of an example method for 3D model generation based on the availability of past scan data of an object, in accordance with some examples of the present disclosure;

FIG. 11 illustrates an example user device, in accordance with some examples of the present disclosure.

DETAILED DESCRIPTION

Figure 1A:
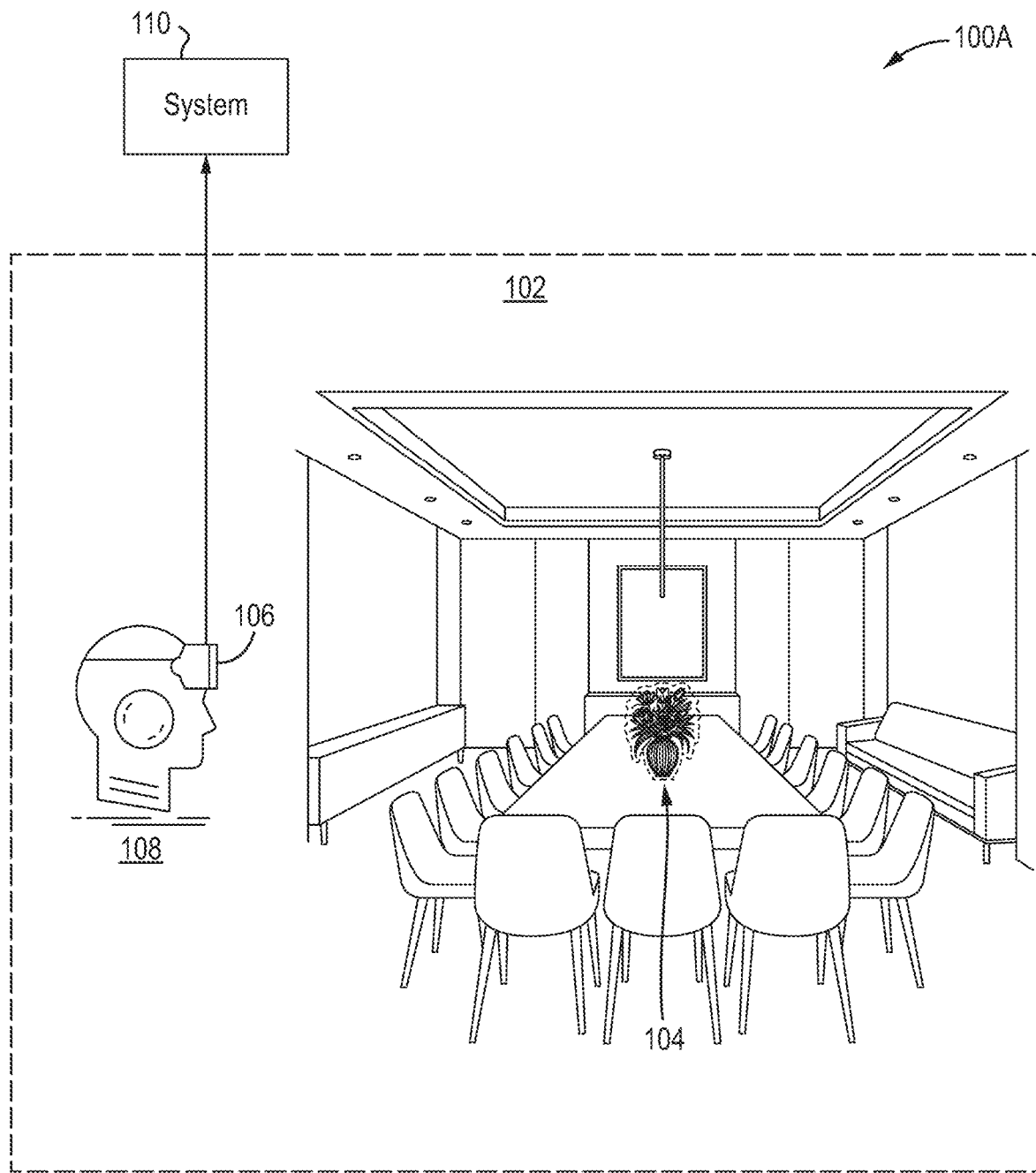
FIGS. 1A-1D show example representations of an operating environment, in accordance with some examples of the present disclosure.

Examples of the present disclosure relate to the domain of 3D object capturing in an Extended Reality (XR) environment and to an optimized system and method for capturing a 3D object within an XR environment, e.g., without user input. Such 3D object capturing techniques may be referred to as "passive" capturing techniques, since they can be performed as a background processing operation, and/or without user input. For example, the methods and systems of the present disclosure do not require active focus by a user on an object when scanning, e.g., objects may be scanned while they are in the peripheral viewport of an XR device.

Because the system performs passive scanning and capturing as a background process and not as the main focus (e.g., processing operation) of an XR session (for example, upon selecting an object for passive scanning, a user may switch between various tasks on a user device), the system continues to passively scan, reducing heat generation and battery usage of the passive scanning operation. Further, the system determines a first object, as well as other instances of the same or similar objects to be passively scanned when they are encountered, re-encountered, stored, and/or used to update or enhance details of another previously scanned object, e.g., independent from the location of the initial object.

In accordance with examples of the present disclosure, upon an initial selection or confirmation of an object of interest by a user via a user device, a passive 3D capture session is established. In some examples, the selection or confirmation of an object may occur automatically based on one or more settings, e.g., in a user profile. This means that even when the object is within an XR viewport, but not the primary focus of the user, the 3D object scanning and generation continues in the background. When the user switches to other tasks, such as using a different application, the system undertakes measures to reduce the computational demands of 3D object generation. This reduction in computational load benefits the performance of XR headsets and conserves battery usage. In the context of the present disclosure, the term "primary focus" may be understood to mean an operation or action of viewing an object in a predetermined area of the XR viewport. For example, a user may apply "primary focus" when an object is within a central portion of the XR viewport, e.g., a portion not within a peripheral portion of the XR viewport.

When the object of interest is selected to initiate the creation of a 3D object, the system transmits high-resolution data to a cloud processing server, if available, for initial processing. The cloud processing server employs model quantization to retain only the necessary parameters, reducing the model's complexity while preserving accuracy. The optimized model is then transmitted to the XR headset for rapid object recognition during subsequent encounters. This process not only diminishes the model file size but also alleviates the load on the XR headset's networking components, enhances battery efficiency, and reduces heat generation.

Upon selecting an object, spatial segmentation is applied to distinguish and store detailed segmentations of a region of interest (ROI). If the object is encountered again, this spatial data serves as a reference, allowing the system to focus on areas with differences, thus bypassing segments that have already been captured and remain unchanged. This efficient process disregards unnecessary details and background elements, leading to reduced computational requirements, minimized heat generation, and lower battery consumption.

When re-encountering the same object, the system utilizes the previously quantized model to evaluate the differences between the past and current capture sessions. The system incrementally updates attributes that have changed, such as orientation or lighting, in order to minimize redundant computational tasks, thus decreasing heat generation and battery usage.

In situations where the XR headset is unable to communicate with the cloud processing server, models may be captured at a lower level of detail, for example, by limiting the number of refinements and iterations. The user may be given the option to suspend other ongoing processes to reduce central processing unit (CPU) utilization, enabling localized model compression to establish an initial capture.

In cases where communication with the cloud processing server is not possible, the user may be informed of potential quality degradation due to limited resources. The system captures and stores auxiliary data from non-focal areas of the selected object for later refinement of the object's features such as materials, reflectivity, and other attributes.

The system allows for automatic shading (e.g., altering the look and feel, material texture, or color) of generated 3D models based on a system setting, such as a user preference.

The system may identify objects that appear in multiple user media data, e.g., photos and videos through analysis, tagging those or similar objects for automatic capture. This may involve ranking objects that are more prominently featured in the user's media data.

The system may automatically prevent the capture of specific types of objects based on policies, metadata associated with a spatial anchor, and/or user preferences. For example, the user may prefer to never capture humans, avoid capturing within certain locations like schools, or only capture a user's pet every few weeks. The system can also track a motion of the object of interest to limit the capture to moments when the object is stationary or take different actions if the object exceeds a certain speed threshold.

The system possesses the capability to recognize similar objects (objects of the same type or category, with the same shape, etc.) and automatically captures those related objects, following user preferences, irrespective of their location, color, or other parameters.

In some examples, collaborative passive capture is facilitated when nearby users, detected using methods such as Global Positioning System (GPS), assisted GPS, 5G positioning techniques, or Radio Frequency (RF) communication protocols like Bluetooth, choose to assist in the capture process by opting in their XR headsets for scanning. This contributes different perspectives and views of the object, reducing the initial load on the XR headset, and allowing for crowdsourcing of a physical environment by a plurality of users. In such examples, the users may be rewarded for their collaborative effort based on their contribution to the collaborative passive scanning of the environment.

Passively capturing objects in a virtual environment may have several technical effects, including the following:

Efficient passive 3D object capture: The system allows users to capture objects in the background while not requiring active focus, significantly improving the user experience. This method operates unobtrusively, allowing users to switch tasks without disrupting the capture process.

Battery and heat efficiency: By reducing the computational load and optimizing the capture process, the system reduces heat generation and minimizes the impact on battery usage of user devices (e.g., XR headsets). The overall usability of XR devices is enhanced, extending their operational time between charges.

User engagement and rewards: The incorporation of reward mechanisms and gamification elements encourages user engagement and participation in the creation of digital twins, enhancing collaboration and content quality.

Scale and diversity of data: The collaboration aspects of the system enable the capture of 3D models at a scale and coverage that may be difficult to achieve through conventional means. This results in a diverse data set representing various objects and environments.

Various examples of the present disclosure will be explained in detail with reference to FIGS. 1-12.

FIGS. 1A-1D show example representations (100A, 100B, 100C, 100D) of an operating environment, in accordance with examples of the present disclosure.

Referring to FIG. 1A, the example representation 100A includes a physical environment 102 that includes a plurality of objects. While pertinent features are shown, a person of ordinary skill in the art will appreciate that various other features have not been illustrated for the sake of brevity and so as not to obscure more pertinent aspects of the example implementations disclosed herein. As a non-limiting example, the example representation 100A includes a user device 106 operated by a user 108, and a system 110. Although a single user device 106 is depicted, a person of ordinary skill in the art will appreciate that there may be any number of user devices 106 in the physical environment 102 to capture the plurality of objects within the scope of the present disclosure.

In some examples, the user device 106 may refer to a wireless device and/or a user equipment (UE). It should be understood that the terms "user device," "wireless device," and "user equipment (UE)" may be used interchangeably throughout the disclosure.

In some examples, the user device 106 may include, but is not limited to, a handheld wireless communication device (e.g., mobile phone, a smartphone, a tablet, and so on), a wearable computer device (e.g., a head-mounted display computer device, a head-mounted camera device, a wristwatch computer device, and so on), a GPS device, and/or any other type of user device with wireless communication capabilities. In some examples, the user device 106 may communicate with the system 110 via a set of executable instructions residing on any operating system. In some examples, the user device 106 may include AR devices (e.g., AR glasses), VR devices (e.g., VR headsets), smart glasses, dedicated XR sensor modules, and customized hardware add-ons, wherein the user device 106 may include one or more built-in or externally coupled accessories. In some examples, the smartphones and tablets may be equipped with advanced sensors such as, but not limited to, accelerometers, gyroscopes, and depth-sensing cameras. The AR glasses may include depth sensors and cameras that may passively capture objects in the physical environment 102. In some examples, the wearable devices such as smartwatches and fitness trackers may be used for passive capturing of objects. In some examples, the dedicated XR sensor modules may include a combination of cameras, light detection and ranging (LiDAR) sensors, and other suitable environmental sensors for capturing objects.

Referring to FIG. 1A, the system 110 may be communicatively coupled to the user device 106 via a network. In some examples, the system 110 may communicate with the user device 106 in a secure manner via the network. The network may include, by way of example at least a portion of one or more networks having one or more nodes that transmit, receive, forward, generate, buffer, store, route, switch, process, or a combination thereof, one or more messages, packets, signals, some combination thereof, or so forth. The network may also include, by way of example one or more of a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fibre optic network, or some combination thereof. In particular, the network may be any network over which the user 108 communicates with the system 110 using their respective user devices (e.g., user devices 106).

Referring to FIG. 1A, the system 110 may be implemented by way of a single device or a combination of multiple devices that may be operatively connected or networked together. The system 110 may be implemented in hardware or a suitable combination of hardware and software. In another example, the system 110 may be implemented as a cloud computing device or any other device that is network connected.

In some examples, the system 110 in conjunction with the user device 106 may passively capture physical objects in the environment 102, without the need for active user participation. Instead of relying on user 108 to initiate capture, the system 110 facilitates generating 3D representations of objects and scenes automatically and passively within a virtual environment (e.g., 102). It may be appreciated that the disclosed system 110 does not require active focus by user 108 on the objects while scanning. For example, the objects may be scanned while the objects are in a peripheral viewport or a periphery of a viewport of the user device 106. Because the system 110 and as such, the user device 106 performs the scanning and capturing as a background process, e.g., not as a main focus of a session, the system 110 facilitates in reducing heat generation and battery usage of the scanning operation. For example, user 108 may switch between various tasks and system 110 may continue to capture the objects. Therefore, system 110 eliminates the need for user 108 to consciously engage in object scanning or manipulation, streamlining their interaction with the virtual environment. In some examples, system 110, in addition to determining an object (e.g., 104), detects the same or similar objects to be passively scanned when such objects may be encountered, re-encountered, stored, or used to update and/or enhance details of another previously scanned object, independent from a location of the previously scanned object.

Referring to FIG. 1A, an object 104 (e.g., a flowerpot in this case) is selected, e.g., by user 108, to be passively captured in the physical environment 102. Such selection may be made via the user device 106 and may be detected by the system 110 from within a virtual environment. In some examples, various gestures may be used to facilitate object detection and selection such as, but not limited to, tap gesture, air tap gesture, pinch gesture, voice command, gaze-based selection, gesture sequence, customized gesture, finger gesture, spatial gesture, physical controller buttons, and the like. In some examples, the user 108 may use a tap gesture on a screen or touchpad of a user device. For hands-free interaction, the user 108 may extend a finger or point towards the object of interest 104 and perform a tap motion in the air. A pinch gesture, where the user 108 may bring two fingers together on a touchpad or in the air, may be used for object selection. In some examples, the user 108 may utter a specific phrase or keyword to select the object of interest 104. User's gaze or eye movements may be used to highlight or select the object 104. A combination of gestures in a specific sequence may be used to initiate an object capture process. For example, a tap followed by a swipe gesture may indicate objection selection. In some examples, the user 108 may define customized gestures for object selection. In some other examples, dedicated buttons on the user device 106 (e.g., controller) may be assigned for object selection.

In some examples, a presence of the object 104 may be detected in the physical environment 102 based on the selection. In response to the detection, a 3D capture session may be initiated by the system 110. For example, a photogrammetry session may be initiated to capture scan data corresponding to the object 104 while the object 104 is in a viewport of the user device 106. As discussed herein, the capturing of the scan data is performed as a background process in the user device 106.

Figure 1B:
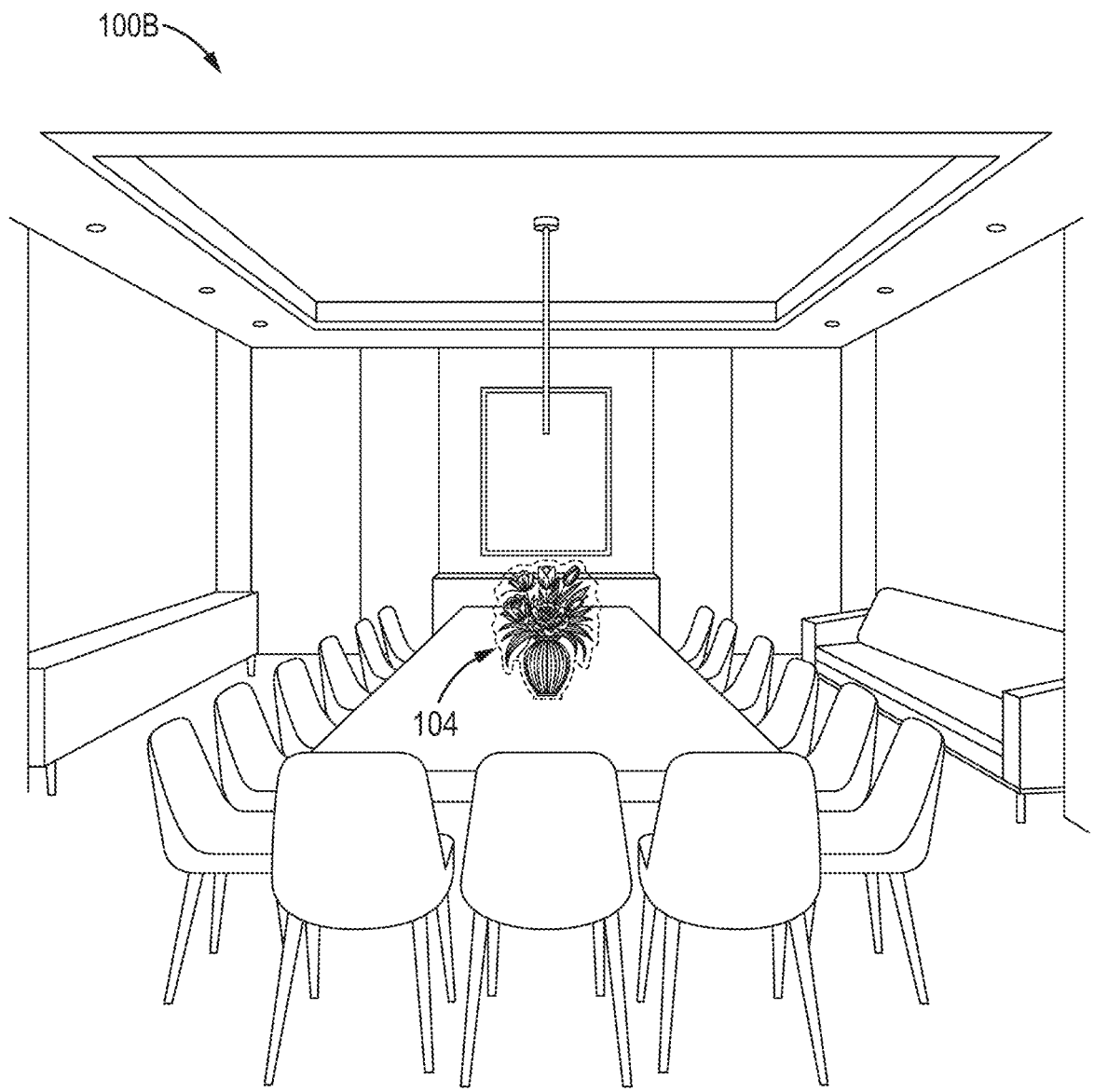

Referring to FIG. 1B, the example representation 100B shows a focus indicator (e.g., an object selection indicator). In an example, the object selection indicator may be displayed around an object (e.g., 104) on a viewport of the user device 106. In some examples, the object selection indicator is displayed in response to a user 108 input selecting object 104. In other examples, the object selection indicator is displayed automatically, e.g., in response to detection of object 104 by control circuitry of user device 106 and/or system 110. Such automatic detection and selection may be based on one or more system settings, e.g., indicating a preference to capture object 104 (or to continue capturing object 104). In an example, the object selection indicator may include, but is not limited to, a highlight, an outline, a glowing effect, a selection box or frame, color change, a holographic tag, dynamic spotlight, pulsing animation, opacity change, icon or symbol, spatial audio cue, contextual highlight (e.g., highlight specific features of the object 104), screen overlay, vibration feedback, or other user interface (UI) element including an assistive UI design element to facilitate capturing of multiple angles of the object 104 in a 3D space. Moreover, any of the previous examples can be used to prompt the user to confirm a selection or intention, such as the intention to create a 3D model. In some examples, the user 108 may continue to point at the object 104, and the selection of the object 104 for capturing may be displayed via a UI element on the viewport of the user device 106.

Figure 1C:
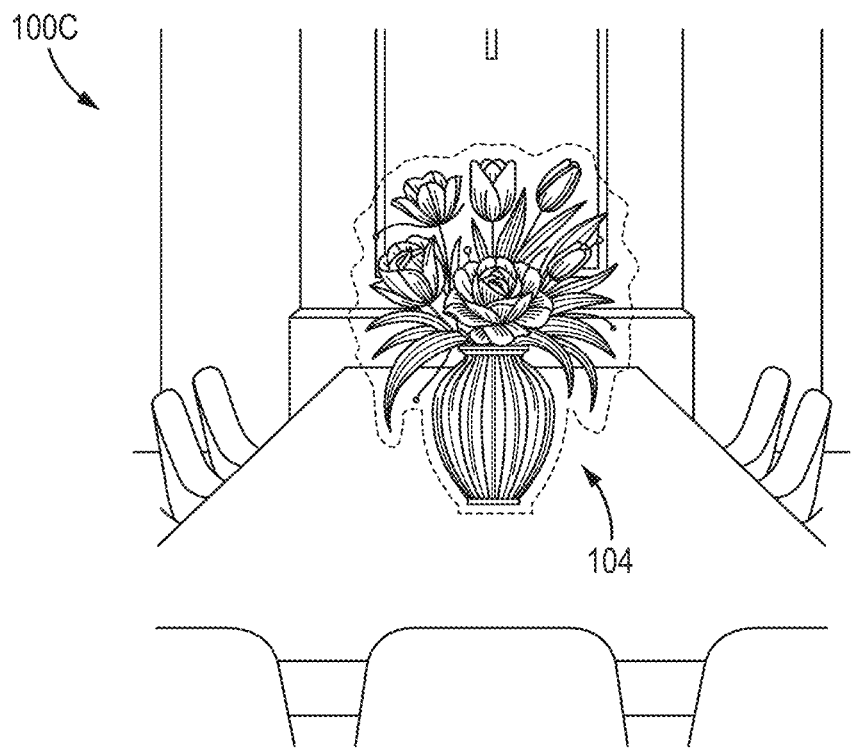

Referring to FIG. 1C, the example representation 100C depicts a user 108 initiating the capturing of the object 104 from a particular distance, for example, five feet from the object 104. In some examples, before initiating the passive scan process, the method comprises an initial scan to determine whether the object or environment is suitable for scanning. For example, if the device is configured to passively capture an object 104, it may utilize object recognition algorithms during the initial scan. This helps in identifying whether the object in the user's field of view is within the device's scanning parameters. This step confirms that resources are not used on irrelevant or unsuitable subjects.

In some examples, the system might prompt the user for input during the initial scan. For example, the user could be asked to confirm whether the current scene or object is suitable for scanning. In some examples, the device may have predefined criteria for what constitutes a suitable object or environment for scanning. This could be based on size, complexity, or other characteristics.

In some examples, the system considers the resources required for scanning by the use of the initial scan, and whether such resources are available. For example, if the device relies on a certain amount of processing power or storage capacity for the primary function the user is using the device for, the initial scan assesses whether the remaining resources for a passive scan are sufficient.

By carefully considering these factors, the initial scan decision ensures that the device optimally utilizes its resources, avoids unnecessary scans, and provides a more user-friendly experience. It contributes to the overall efficiency and effectiveness of the scanning process.

Figure 1D:
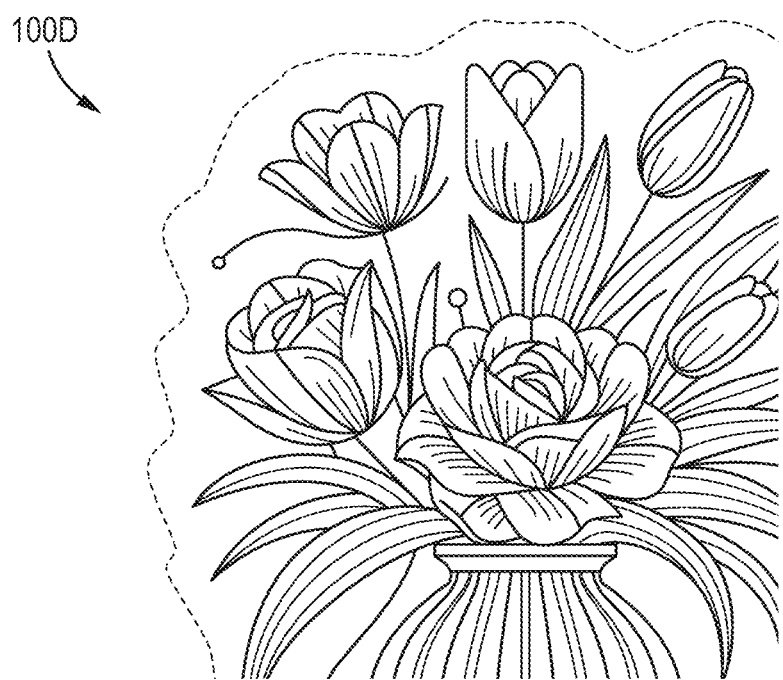

Referring to FIG. 1D, the example representation 100D depicts the user 108 moving closer to a selected object 104 in order to add detail to the generated object. In some examples, the user may zoom to add detail to update or enhance the generated 3D model, for example, by zooming with a camera or by moving closer to the object 104 with the user device 106. In some examples, once the initial 3D object has been created, when the user 108 moves closer to the model, finer details are captured and the model and its textures are updated.

Although FIGS. 1A-1D show exemplary components of the operating environment 100A-100D, in other examples, the operating environment 100A-100D may include fewer components, different components, differently arranged components, or additional functional components than depicted in FIGS. 1A-1D. Additionally, or alternatively, one or more components of the operating environment 100A-100D may perform functions described as being performed by one or more other components of the operating environment 100A-100D.

Figure 2:
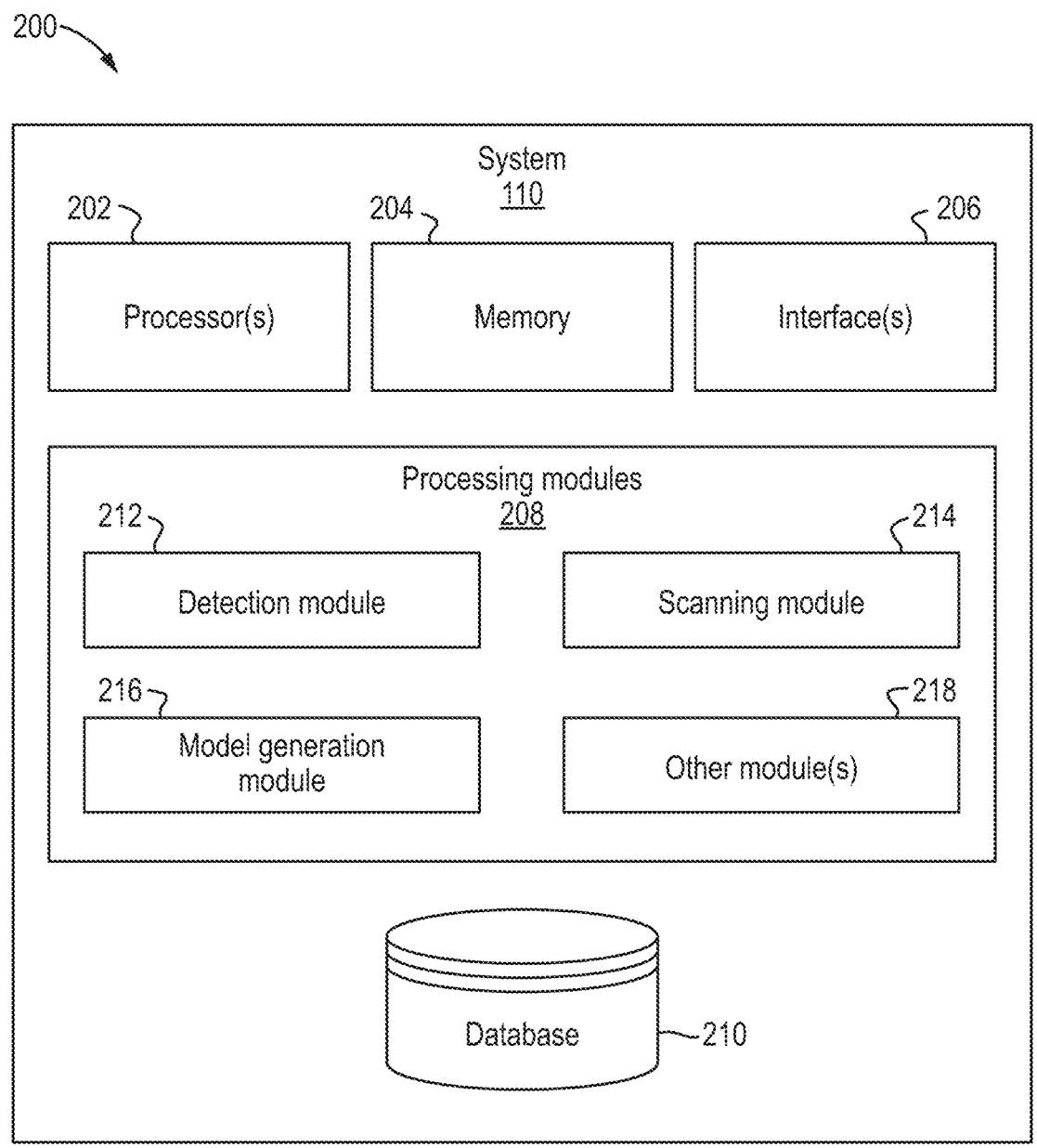
FIG. 2 illustrates an example block diagram of a proposed system, in accordance with some examples of the present disclosure.

FIG. 2 illustrates an example block diagram 200 of a proposed system (e.g., 110), in accordance with examples of the present disclosure.

Referring to FIG. 2, the system 110 may include, but is not limited to, one or more processor(s) 202, a memory 204, an interface 206, one or more processing module(s) 208, and a database 210. In some examples, the processor 202 may communicate with the memory 204. The memory 204 may consist of multiple memory units and store non-transitory instructions that the processor 202 may execute in accordance with examples of the present disclosure. In some examples, the interface 206 may facilitate communication between the processor 202 and external entities including, but not limited to, a user device (e.g., 106). In some examples, the interface 206 may employ various communication media, such as radio, optical fibre, telephone, wire, etc. The interface 206 may also include one or more communication networks, including the Internet. Further, database 210 may be communicatively coupled with the processor 202 and the memory 204. The database 210 may store data in a structured format and provide fast access to the stored data. The processor 202 may access the database 210 to retrieve or store data as required by the present disclosure. In some examples, the system 110 may be implemented as a cloud server which may execute operations through web applications, cloud applications, hypertext transfer protocol (HTTP) requests, repository operations, file transfer, and the like. In some examples, the system 110 may be implemented as a plurality of distributed cloud-based resources by use of several technologies that are well known to those skilled in the art.

In some examples, the functionality of the system 110 may be incorporated in its entirety or at least partially in a server (not shown), without departure from the scope of the disclosure. The server may be implemented as a cloud server which may execute operations through web applications, cloud applications, HTTP requests, repository operations, file transfer, and the like. Other examples of the server may include, but are not limited to, a database server, a file server, a web server, a media server, an application server, a mainframe server, a cloud server, or other types of servers. In one or more examples, the server may be implemented as a plurality of distributed cloud-based resources by use of several technologies that are well known to those skilled in the art.

In some examples, the processor 202 may include suitable logic, circuitry, and interfaces that may be configured to execute program instructions associated with different operations to be executed by the system 110. In some examples, the processor 202 may be implemented as one or more microprocessors, microcomputers, microcontrollers, edge or fog microcontrollers, digital signal processors, central processing units, logic circuitries, and/or any devices that process data based on operational instructions. Examples of implementations of the processor 202 may be a graphics processing unit (GPU), a reduced instruction set computing (RISC) processor, an application-specific integrated circuit (ASIC) processor, a complex instruction set computing (CISC) processor, a microcontroller, a central processing unit (CPU), and/or a combination thereof.

Among other capabilities, the processor 202 may be configured to fetch and execute computer-readable instructions stored in the memory 204 of the system 110. The memory 204 may be configured to store one or more computer-readable instructions or routines in a non-transitory computer readable storage medium, which may be fetched and executed to create or share data packets over a network service. The memory 204 may comprise any non-transitory storage device including, for example, volatile memory such as random-access memory (RAM), or non-volatile memory such as electrically erasable programmable read-only memory (EPROM), flash memory, and the like.

In some examples, the interface(s) 206 may comprise a variety of interfaces, for example, interfaces for data input and output devices, referred to as input/output (I/O) devices, storage devices, and the like. The interface(s) 206 may facilitate communication for the system 110. The interface(s) 206 may also provide a communication pathway for one or more components of the system 110. Examples of such components include, but are not limited to, the processing module(s) 208 and the database 210. In some examples, the database 210 may comprise data that may be either stored or generated as a result of functionalities implemented by any of the components of the system 110 such as, but not limited to, scan data corresponding to objects (e.g., 104), user preferences, user profile, and the like.

Although the database 210 is shown as being a part of the system 110, it is to be understood that in other examples, the database 210 may be separate from the system 110 and may be hosted on another server that is communicatively coupled to the system 110. In some examples, the database 210 may be cloud hosted.

In some examples, the processing module(s) 208 may be implemented as a combination of hardware and programming (for example, programmable instructions) to implement one or more functionalities of the processing module(s) 208. In examples described herein, such combinations of hardware and programming may be implemented in several different ways. For example, the programming for the processing module(s) 208 may be processor-executable instructions stored on a non-transitory machine-readable storage medium and the hardware for the processing module(s) 208 may comprise a processing resource (for example, one or more processors), to execute such instructions. In the present examples, the machine-readable storage medium may store instructions that, when executed by the processing resource, implement the processing module(s) 208. In such examples, the system 110 may comprise the machine-readable storage medium storing the instructions and the processing resource to execute the instructions, or the machine-readable storage medium may be separate but accessible to the system 110 and the processing resource. In other examples, the processing module(s) 208 may be implemented by an electronic circuitry.

Referring to FIG. 2, the processing module(s) 208 may include a detection module 212, a scanning module 214, a model generation module 216, and other module(s) 218. In some examples, the other module(s) 218 may include, but is not limited to, a data ingestion module, a notification module, or the like, within the scope of the present disclosure.

In some examples, a selection of an object (e.g., 104) from within a virtual environment may be detected (e.g., by the detection module 212) to be passively captured in a physical environment (e.g., 102) by a user (e.g., 108) via a user device (e.g., 106). In some examples, a presence of the object 104 in the physical environment 102 may be detected (e.g., by the detection module 212) based on the selection. In some other examples, media data may be received (e.g., by the processor 202) from the user 108 via the user device 106. The object 104 may be determined (e.g., by the processor 202) from the media data, for example, based on a frequency of occurrence of the object 104 in the media data.

In some examples, the system 110 may use artificial intelligence (AI) techniques to analyze the media data to detect objects or types of objects which occur multiple times, for example if a user often takes pictures of cars or flowers or birds. In some examples, a priority for scanning the object 104 among other objects in the physical environment 102 may be generated (e.g., by the processor 202). In some other examples, an indication of priority for capturing the objects 104 may be received (e.g., by the processor 202) from the user 108 via the user device 106. In some examples, a classifier may be trained by the system 110. A classifier is a type of machine learning algorithm used to assign a class label to a data input. An example is an image recognition classifier to label an image (e.g., "car," "truck," or "person"). Classifier algorithms are trained using labeled data; in the image recognition example, for instance, the classifier receives training data that label images. After sufficient training, the classifier then can receive unlabeled images as inputs and will output classification labels for each image. In this way, the user (e.g., user 108) can train a specific classifier, passively or otherwise, or the user device (e.g., device 106) can be instructed by system 110 to identify objects to train a classifier. In some examples, a plurality of users can collaborate to train a single classifier. Thereafter, the user device 106 can detect unlabeled objects and output a label for an object based on previously trained classifiers.

In some examples, a 3D capture session may be initiated (e.g., by the processor 202) based on the detection of the object 104 by the detection module 212. In some examples, scan data corresponding to the object 104 may be captured (e.g., by the scanning module 214) during the 3D capture session while the object 104 is in a viewport of the user device 106. In some examples, the scan data corresponding to the object 104 may be captured based on the priority of scanning (e.g., either generated by the system 110 or received from the user 108). It may be appreciated that the capturing of the scan data is performed as a background process in the user device 106. In some examples, the scan data may be stored in the database 210.

In some examples, a 3D model of at least a portion of the object 104 may be generated (e.g., by the model generation module 216) based on the capturing. Spatial segmentation may be applied on the scan data corresponding to the object 104 (e.g., by the model generation module 216). A region of interest associated with the object 104 may be identified based on the spatial segmentation, and one or more segments of the region of interest may be stored in the database 210. In some examples, completion status data for the generation of the 3D model may be determined. Based on the completion status data, an overlay comprising the 3D model may be generated and displayed on the viewport of the user device 106. In some examples, the overlay may be aligned to an orientation and a location of the object 104 in the physical environment 102. Alternatively, or additionally, the 3D model may be displayed within the virtual environment adjacent to the object 104 in the physical environment 102. In some examples, the 3D model may be depicted by an object selection indicator (e.g., highlight, UI element, and the like) on the viewport of the user device 106 based on a set of user preferences. In some examples, the completion status data is accessible to the user, for example, as a completion percentage.

In some examples, the set of user preferences may include, but is not limited to, capture priority, for example, the user 108 may prioritize capturing objects of a particular category, color, or shape; capture frequency, for example, the user 108 may set the frequency of capture of certain objects, e.g., once a day, week, or month; exclusion preferences, for example, the user 108 may specify objects or categories of objects that they do not want to capture (e.g., humans, sensitive locations, certain types of objects, etc.); privacy preferences, for example, the user 108 may define spatial boundaries or privacy zones where capture may be restricted; customized object annotations, visual customization, for example, the user 108 may specify texture, material, color, or level of detail of generated models; collaboration preferences such as the user 108 may set preferences on when and how nearby users may assist in capturing objects or provide different views, and the like. It may be appreciated that these are non-limiting examples of the user preferences, and there may be other preferences such as capture quality preferences, energy efficiency preferences, or the like, within the scope of the present disclosure.

In some examples, a motion of the object 104 (e.g., a cat (not shown)) in the physical environment 102 may be tracked by the system 110. The scan data corresponding to the object 104 may be captured (e.g., by the scanning module 214) based on a speed of the motion of the object 104. In some examples, the scan data may be captured based on the speed of the motion of the object 104 being within a pre-defined threshold. In some examples, the system 110 may detect when an object which is in the process of being captured is obscured. For example, when an object passes in front of the object of interest. In this case, scanning may be paused until the object has stopped moving or is in full view. In some examples, the user 108 may set a preference for capturing objects only when the objects are completely still or below a relative speed to the user. In this way, artifacts in the scanning of objects are reduced. Objects with any movement above the pre-defined threshold may be excluded from capture.

In some examples, a variable speed threshold may be set for different types of objects. For example, the user 108 may specify that a fast-moving object (e.g., a car) may be captured if the speed is below the pre-defined threshold, whereas stationary objects may have a speed threshold of zero. In some examples, the motion-based tagging may be implemented, whereby objects with motion above the pre-defined threshold may be automatically tagged by the system 110 as "in motion" and captured differently, allowing the system and/or user 108 to differentiate static and dynamic objects. In some examples, event-based capturing may be implemented, where the system 110 may automatically select objects for capture when the objects perform specific actions, like stopping, starting, or changing direction, regardless of the speed.

In some examples, the scan data corresponding to the object 104 may be transmitted to a server, for example, the database 210 may be located on the server. A set of features corresponding to the object 104 may be received by the system 110 from the server. In some examples, the 3D model may be generated (e.g., by the model generation module 216) based on the set of features. Alternatively, the set of features may be extracted by the system 110 based on the scan data. The set of features may include, but is not limited to, geometric shape, including size, dimension, and contours, texture and material including roughness, smoothness, reflectivity, and transparency, color and appearance, surface details such as scratches, patterns, and engravings, structural integrity such as joints, hinges, or moving parts, and the like. It may be appreciated that these are non-limiting examples of the set of features of objects and may include more features within the scope of the present disclosure.

In some examples, availability of past scan data for the object 104 may be determined by the system 110. The past scan data may be associated with a previous capture session of the object 104. Based on the availability of the past scan data, a previous 3D model for the object 104 may be retrieved from the database 210. In some examples, one or more differences between the previous 3D model and the scan data from the current 3D capture session may be evaluated, and the set of features of the object 104 may be updated and/or enhanced based on the evaluated differences. In some examples, based on the set of features, external data (e.g., similar objects 104) corresponding to the object 104 in the physical environment 102 may be detected (e.g., by the detection module 212). The external data may be captured (e.g., by the scanning module 214) based on the set of user preferences.

It may be appreciated that in some examples, reward data may be generated for the user 108 to facilitate the capturing of the objects 104 in the physical environment 102. The system 110 may, for example, generate a digital twin of the physical environment 102 including the objects 104 in the virtual environment. By generating for and associating the reward data for the user 108, the user 108 may be motivated to capture the objects 104 and the external data from the physical environment to create more digital twins (e.g., scenes) in the virtual environment. In order to incentivize user participation, the reward data may be generated by the system 110 and associated with users who actively contribute to the creation and refinement of digital twins. In some examples, the reward data may be in the form of virtual currency, digital assets, access to premium content, or other valuable incentives. In some other examples, system 110 may include a marketplace where users may exchange the reward data, for example, by helping each other via peer reviews, thereby creating an ecosystem of users, creators, and consumers of digital twin content.

In some examples, data collected from various users may be integrated into a central repository by the system 110. The system 110 may use the data from the central repository to generate digital twins. In some examples, the users may be enabled to identify and tag objects or environments in the digital twins, which may add to the richness and usefulness of the digital twins. The users may mark, label, or annotate specific elements within the digital twin, contributing to contextual information associated with the digital twin. For example, users may tag a digital twin of a cityscape with labels identifying landmarks, buildings, or points of interest.

Although FIG. 2 shows exemplary components of the system 110, in other examples, the system 110 may include fewer components, different components, differently arranged components, or additional functional components than depicted in FIG. 2. Additionally, or alternatively, one or more components of the system 110 may perform functions described as being performed by one or more other components of the system 110.

Figure 3A:
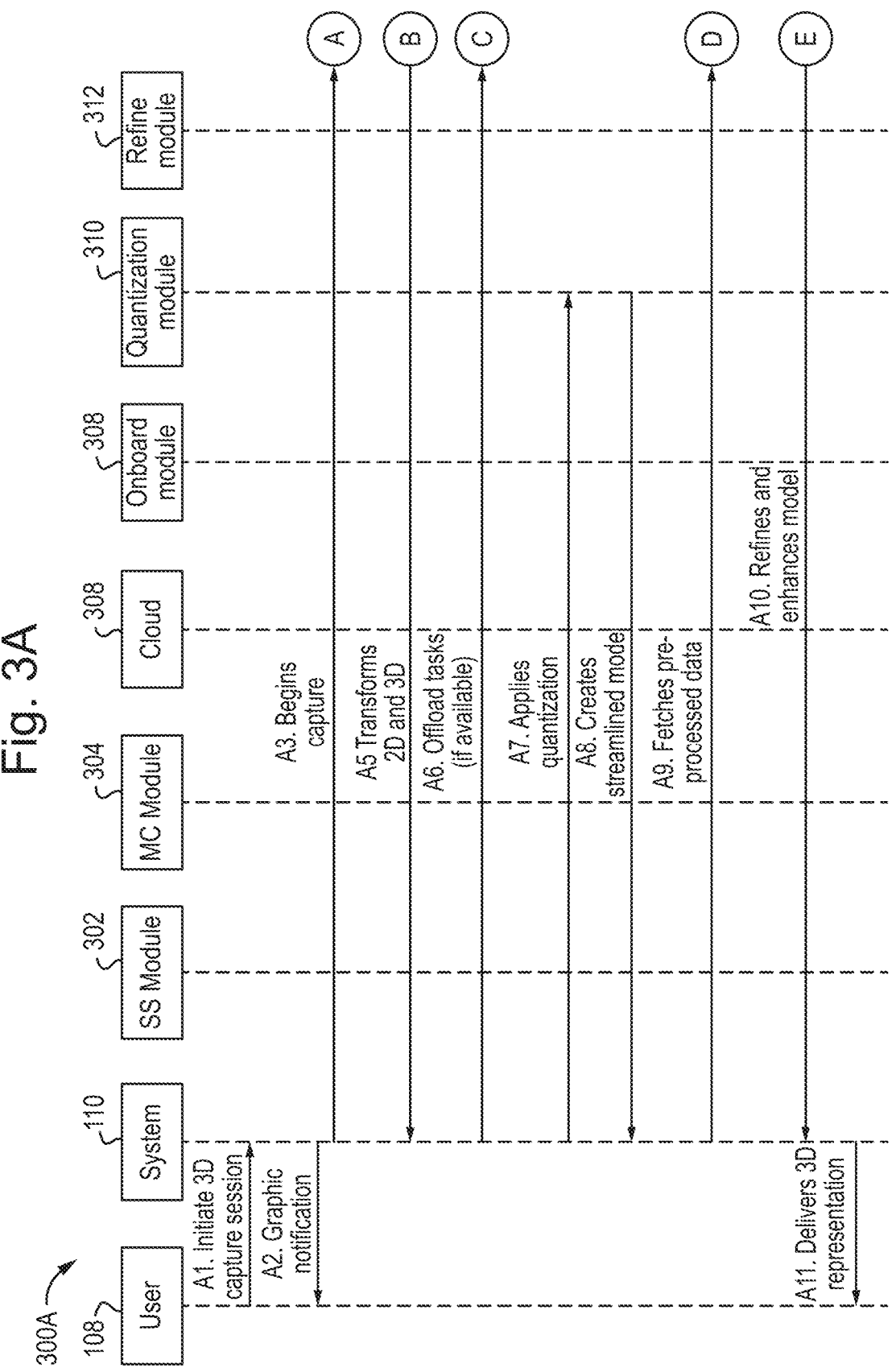

FIGS. 3A and 3B illustrate a sequence diagram (300A, 300B) for implementing a proposed system (e.g., 110), in accordance with examples of the present disclosure.

In accordance with examples of the present disclosure, a system (e.g., 110), as disclosed herein, enables an object to be selected for 3D capture from within a virtual environment, to efficiently create scans of the selected object when the object may not be the area of focus within the virtual environment, to categorize the selected object and recognize when the object or similar objects may be re-encountered, to passively enhance features of the object from subsequent encounters of the same or similar objects when encountered. Additionally, the system 110 performs passive scanning and 3D object generation in an efficient manner by managing the computational requirements resulting in lower heat generation and reduced battery drain.

Referring to FIG. 3A, at step A1, a 3D capture session may be initiated by a user (e.g., 108) within a virtual environment. In some examples, a selection of an object by the user 108 may be detected by a system (e.g., 110). In some examples, the user 108 may select the object by using suitable gestures, as discussed herein. In other examples, the detection and selection of the object may be automatic, e.g., in response to the system detecting an object belonging to a category or set of objects. In response to the detection and/or selection, the 3D capture session may be initiated. At step A2, a graphic notification, for example, in the form of an object selection indicator may be indicated by the system 110 to the user 108. As discussed herein, the object selection indicator may include a highlight or any assistive UI design element around the object to indicate the selection of the object.

At step A3, capturing of scan data corresponding to the selected object may be initiated by the system 110. As the user 108 navigates within the XR space, the system 110 observes the environment, focusing on the selected object even when the user 108 may not be actively focusing on or viewing the object, capturing peripheral scan data as well as external environmental data which may be later used for enhancing features of the object, for example, but not limited to, materials, reflectivity, colors, and the like. This passive accumulation ensures that object detail is collected and aids in constructing a comprehensive data set without continuous active input.

Referring to FIG. 3B, in some examples, to efficiently scan the object, reduce computational requirements, and reduce the impact on the thermal dissipation (heat) and battery drain, the system 110 first segments the area to perform scanning. At step A3, a spatial segmentation module 302 (or SS module) may be indicated to capture the scan data. In some examples, spatial segmentation may be applied by the spatial segmentation module 302 on the object to segment the area. A region of interest associated with the object may be identified based on the spatial segmentation, and one or more segmentations of the region of interest may be stored in a database (e.g., 210). Referring to FIG. 3B, at step A4, based on the spatial segmentation, certain areas corresponding to the object may be prioritized for scanning (e.g., region of interest) by a model compression module 304 (or MC module). This ensures that the object and immediate surroundings of the object are focused on, thereby reducing, or preventing a user device (e.g., 106) from performing continual scans when the object is not within the viewport of the user device 106.

At step A5, two-dimensional (2D) data of the object may be transformed into a 3D model and indicated to the system 110. For example, once the system 110 has determined the areas or regions, 3D scanning techniques such as, but not limited to, laser triangulation, structured light scanning, photogrammetry, or AI-based technologies such as neural radiance fields (NeRF) may be used to transform the relevant parts of 2D images into detailed 3D models. A person of ordinary skill in the art will understand that NeRF may refer to a machine learning technique that focuses on 3D scene reconstruction and rendering using volumetric representation and neural networks.

By processing only the segmented and prioritized areas, computationally intensive techniques such as NeRF operate on data points associated with pertinent sections, thereby increasing efficiency and reducing heat dissipation and battery drain. It may be appreciated that NeRF uses radiance and volume density of a scene from multiple 2D images to create a 3D scene. The system 110 helps in reducing the number of redundant computations, because the NeRF operates on optimized data, e.g., post-spatial segmentation, allowing for a more efficient and precise model generation. It may be appreciated that the efficiency of NeRF lies in the ability to predict color and volume for any given viewpoint, which is inherently computationally demanding. By narrowing down the input data using the spatial segmentation module 302, the number of computations conventionally required is reduced.

At step A6, if cloud computing is available, the system 110 may offload tasks on cloud 306 by transmitting the scan data to the cloud 306 based on type of processing required. For example, processes such as NeRF require parallel processing, and accordingly, may be implemented on the cloud 306 having graphics processing unit (GPU) processing capability. In some other examples, for processes requiring CPU, for example, handling data retrieval, or deciding which data may be offloaded to persistent storage, the system 110 may select the cloud 306 which may be optimized for CPU processing. In some examples, when cloud computing is available, NeRF or other computational processes may be performed in parallel, with different segmented portions processed on different servers, which offloads computational operations from the user device 106 and as such the system 110, reducing heat dissipation and battery drain while reducing the time required for scanning. Additionally, when using cloud resources, system 110 may keep track of more objects and more instances of each object. When an object is re-encountered, the system 110 may quickly fetch pre-processed data which may be fine-tuned rather than constructing the object from the beginning.

In some other examples, when cloud computing may not be available and the user device 106 may have to rely on onboard processing capabilities (e.g., 308), the system 110 may adapt the processes locally. For example, system 110 may reduce the precision of the neural networks used in NeRF so that the models may be suited for processing on limited local hardware. Additionally, the spatial segmentation module 302 may restrict the area of focus to an even greater extent in order to reduce the computational requirements. If other user devices (e.g., XR headsets) are detected to be within the same immediate environment, and if allowed by their respective users, the user device 106 may request co-located user devices to assist in either the scanning or processing of scanned data on behalf of the user device 106.

Referring to FIG. 3A, at step A7, quantization may be applied by a quantization module 310. When the model is first captured in the initial scan and constructed (through NeRF for example), the precision of the numbers representing the model's parameters may be reduced by the quantization module 310, trading off accuracy for a decrease in model size and computational requirements. This streamlines the model to ensure that the model remains lightweight such that the system 110 may be able to update the model locally. The degree of quantization may be dependent on the availability of cloud computing or if the processing is to be performed locally on the system 110. When processing locally, a more aggressive quantization may be implemented, e.g., the model parameters may be represented using fewer bits, reducing the computational complexity, and ensuring minimal heat generation and battery consumption. When cloud computing is available and has access to more powerful GPUs, quantization may be relaxed allowing the generation of higher fidelity models. At step A8, based on the quantization, a streamlined 3D model may be created by the quantization module 310.

In some examples, at step A9, when the object is re-encountered, past scan data corresponding to the object may be checked and fetched by a refine module 312 from the database 210. In some examples, system 110 may fetch the highest quantized model. This allows a faster start-up for the scanning process by reducing the need to fetch larger models from the database 210. In case the past scan data is available, at step A10, the 3D model created (e.g., at step A8) may be refined and enhanced by the refine module 312. The past scan data may be compared to the new scan data and the system 110 may identify parts of the object that may need further details or refinement. Only these areas may be re-processed, which improves the efficiency of the system 110. It may be beneficial to cluster similar data points and quantize the clustered data points as a single unit, preserving finer details which may be relevant (for example, in a close-up view).

When system 110 encounters multiple instances of a similar object, system 110 may use the multiple instances of the object to refine the model. For example, if user 108 first passively captures a chair in one setting and later encounters a similar chair in a different setting, system 110 uses the second instance to fill in details that might have been missed during the first capture. This iterative enhancement, driven by multiple exposures to same objects, ensures a more robust and detailed 3D representation.

Referring to FIG. 3A, at step A11, 3D representation of the object may be delivered to the user 108 by the system 110, for example, via a user device (e.g., 106). The system 110 ensures that users get a high-quality 3D representation without the need for meticulous manual input. By using the system 110, users can strike a balance between efficiency and accuracy.

It will be appreciated that the steps shown in FIGS. 3A and 3B are merely illustrative. Other suitable steps may be used, if desired. Moreover, the steps of FIGS. 3A and 3B may be performed in any order and may include additional steps.

Figure 4:
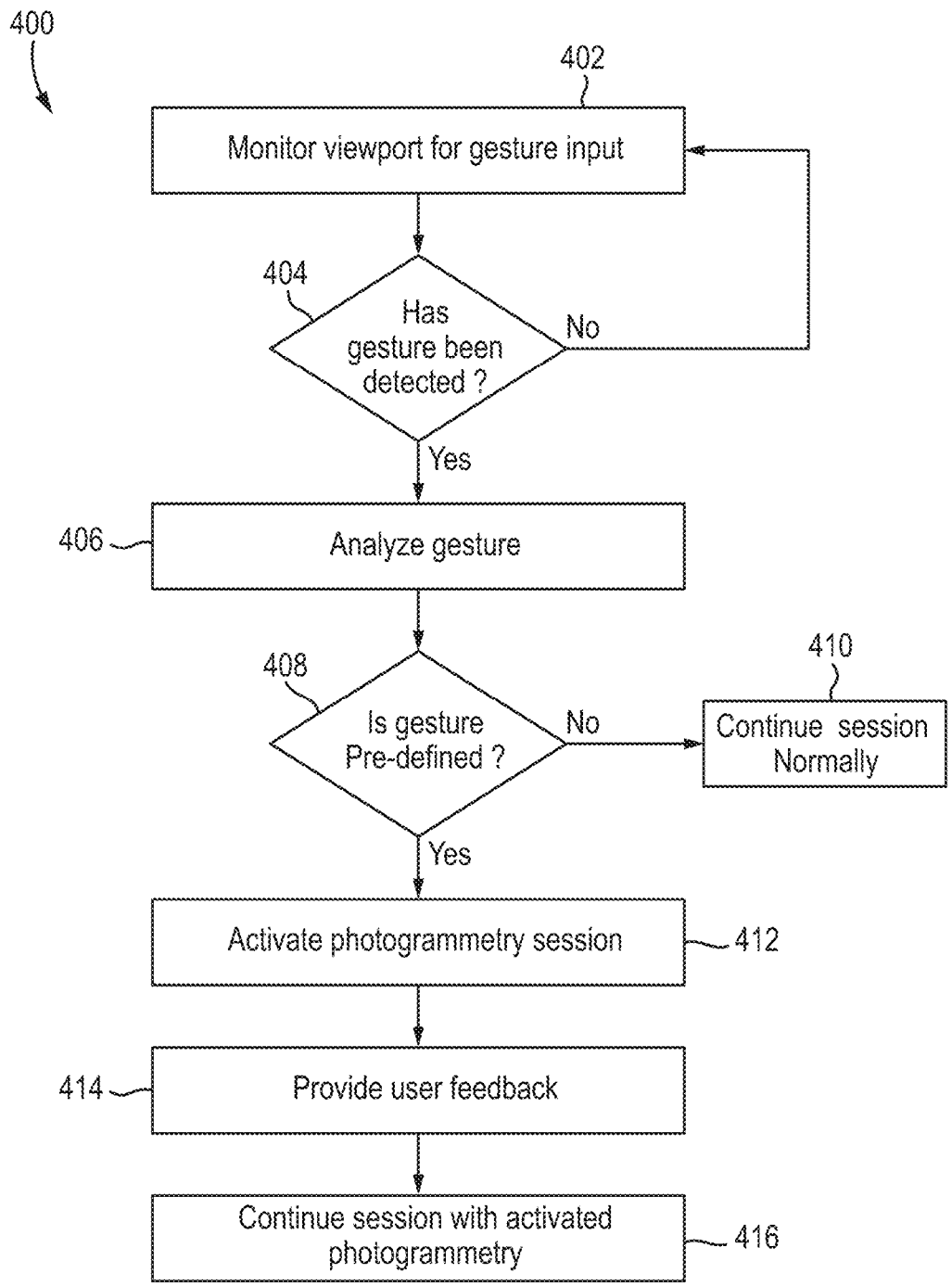
FIG. 4 illustrates a flowchart of an example method for detection of selection of an object by a user, in accordance with some examples of the present disclosure.

FIG. 4 illustrates a flowchart of an example method 400 for detection of selection of an object by a user, in accordance with examples of the present disclosure. It may be appreciated that blocks of the method 400 may be implemented at the system 110.

Referring to FIG. 4, at block 402, a viewport of a user device (e.g., 106) may be monitored for gesture input by a user (e.g., 108). As discussed herein, the gesture may include, but is not limited to, a long touch or encircling gesture on a touchscreen of the user device 106, or a long point or encircling or other such gesture from within the user device 106, for example, where hand tracking may be available, and the like. At block 404, the system 110 may determine if the gesture has been determined. If the gesture is not detected, the viewport of the user device 106 may continue to monitor the gesture input. At block 406, if the gesture input is detected (e.g., at block 404), the gesture may be analyzed by the system 110.

At block 408, the system 110 may determine if the detected gesture is a pre-defined capture activation gesture, e.g., a photogrammetry activation gesture. It may be appreciated that other processes for capturing objects may be used within the scope of the present disclosure. At block 410, if the detected gesture is not a pre-defined capture activation gesture, XR session may continue normally. At block 412, if the detected gesture is a pre-defined capture activation gesture, a photogrammetry session may be activated. At block 414, user feedback, for example, visual or audio cues may be provided. At block 416, XR session with activated photogrammetry may be continued.

It will be appreciated that the blocks shown in FIG. 4 are merely illustrative. Other suitable blocks may be used, if desired. Moreover, the blocks of FIG. 4 may be performed in any order and may include additional operations.

FIG. 5 illustrates a flowchart of an example method 500 of generating an overlay of a 3D model, in accordance with examples of the present disclosure. It may be appreciated that the blocks of the method 500 may be implemented at the system 110.

Referring to FIG. 5, at block 502, a photogrammetry session may be monitored. In some examples, the system 110 may monitor whether 3D capture session is completed. At block 504, the system 110 may determine if at least a portion of 3D model corresponding to an object (e.g., 104) is successfully completed. In some examples, the system 110 may determine completion status data for generation of the 3D model for at least a portion of the object 104. If the 3D model for at least a portion of the object 104 is not complete, the system 110 may continue to monitor the photogrammetry session for completion (e.g., block 502). At block 506, if the 3D model for at least a portion of the object 104 is complete, the 3D model may be retrieved. At block 508, an overlay comprising the retrieved 3D model may be generated and displayed on a viewport of a user device (e.g., 106). In some examples, the overlay comprising the 3D model may be aligned to an orientation and a location of the object 104 in a physical environment (e.g., 102). In some other examples, the retrieved 3D model may be displayed, within a virtual environment, adjacent to the object 104 in the physical environment 102.

It will be appreciated that the blocks shown in FIG. 5 are merely illustrative. Other suitable blocks may be used, if desired. Moreover, the blocks of FIG. 5 may be performed in any order and may include additional operations.

Figure 6A:
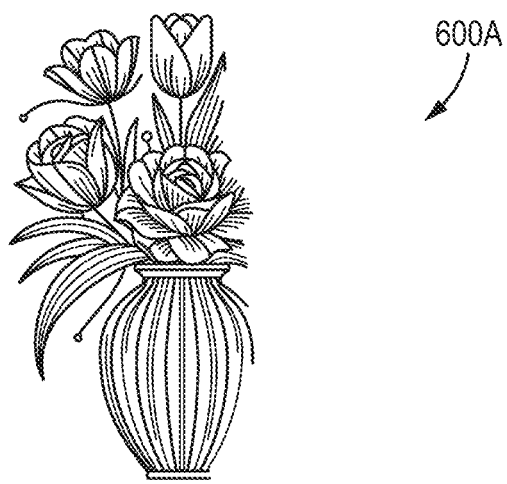
FIGS. 6A-6C illustrate example representations for 3D model generated by a proposed system corresponding to an object, in accordance with some examples of the present disclosure.
Figure 6B:
Figure 6C:
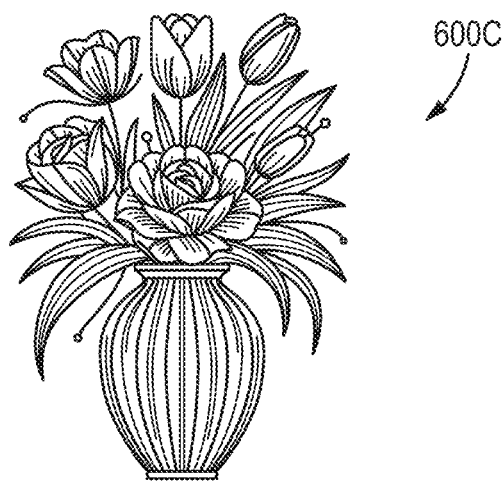

FIGS. 6A-6C illustrate example representations (600A, 600B, 600C) for 3D model generated by a proposed system (e.g., 110) corresponding to an object (e.g., 104), in accordance with examples of the present disclosure.

Referring to FIG. 6A, the example representation 600A depicts a 3D model of a portion of an object 104 generated by the system 110.

Referring to FIG. 6B, the example representation 600B depicts an overlay of the 3D model on top of the real object 104 during a capture session.

Referring to FIG. 6C, the example representation 600C depicts the 3D model of complete capture of the object 104.

Figure 7:
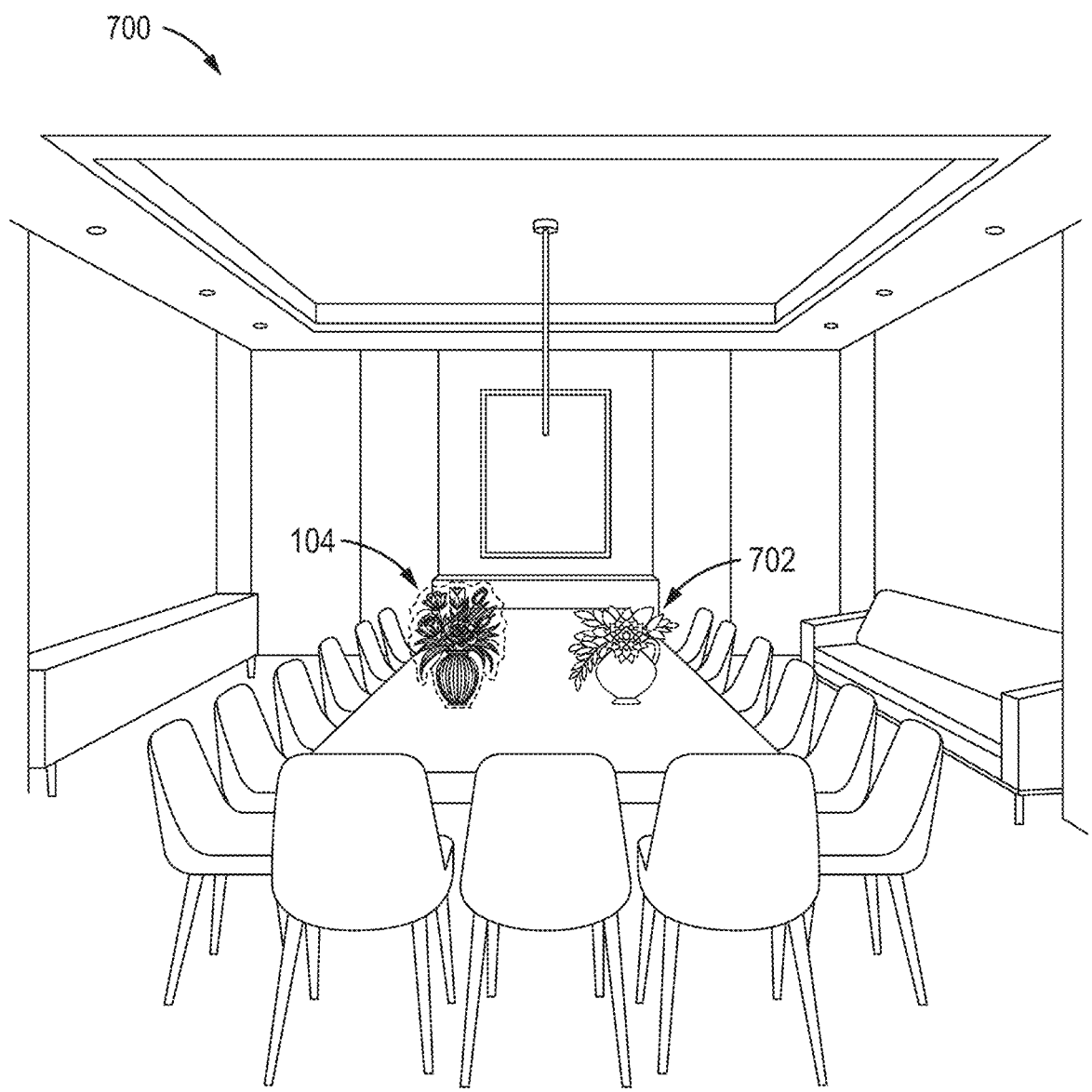
FIG. 7 illustrates an example representation for display of a 3D model adjacent to a real object, in accordance with some examples of the present disclosure.

FIG. 7 illustrates an example representation 700 for display of a 3D model adjacent to a real object, in accordance with examples of the present disclosure.

Referring to FIG. 7, the example representation 700 depicts a 3D model 702 generated by the system (e.g., 110) adjacent to the real object 104. A user (e.g., 108) may compare the object 104 and the 3D model 702 and provide feedback to the system 110 to improve and/or enhance features of the 3D model 702. User 108 can provide feedback, for example, through a secondary device, in-application feedback prompts, voice commands, a rating system, or the like. In some other examples, the system 110 may evaluate differences between the object 104 and the 3D model 702 to update, improve, and/or enhance the 3D model 702.

Figure 8A:
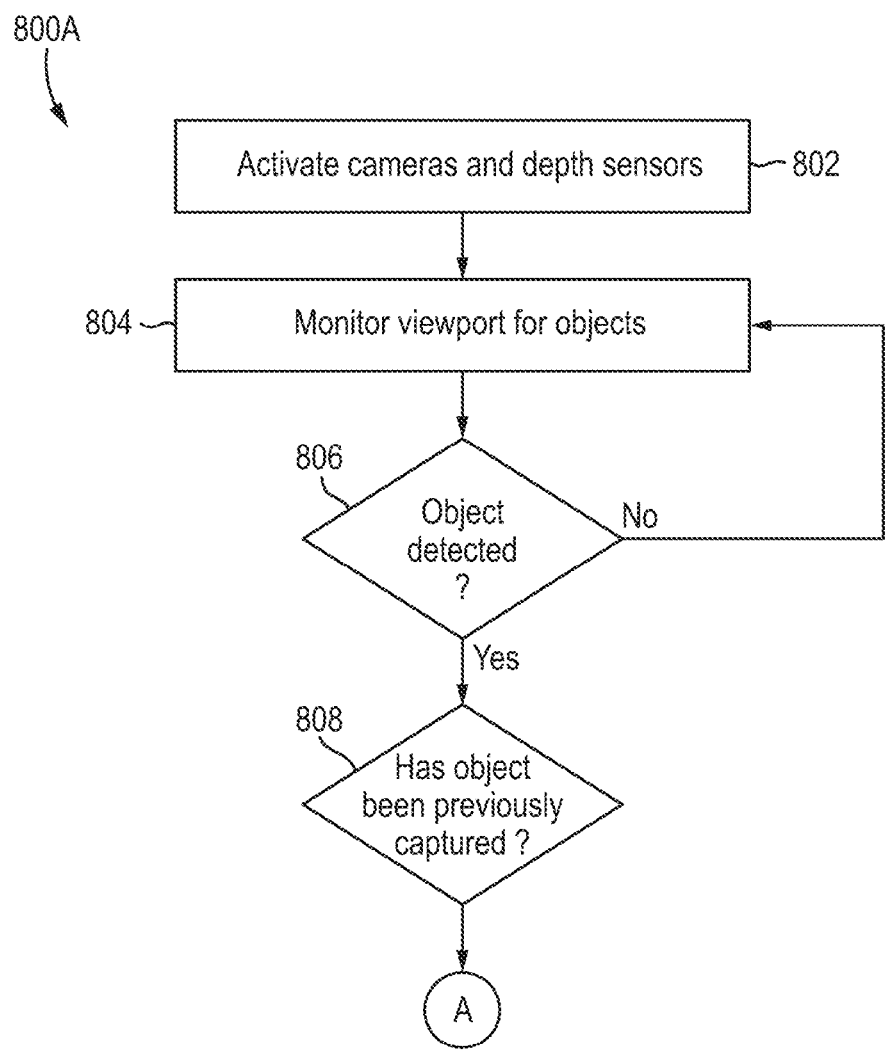

FIGS. 8A and 8B illustrate a flowchart of an example method (800A, 800B) for 3D model generation based on availability of past scan data of an object (e.g., 104), in accordance with examples of the present disclosure. It may be appreciated that the method (800A, 800B) may be implemented at the system 110.

In accordance with examples of the present disclosure, creation of 3D objects that a user (e.g., 108) encounters using a user device (e.g., 106) may be automated or enabled based on a set of user preferences. In some examples, the set of user preferences may include, but is not limited to, a pre-defined gesture, features such as material preferences, color preferences, and the like. In some examples, 3D capture sessions of previously encountered objects may be resumed to perform further capture of the objects for completion of capture, detail enhancement, and further processing.

Referring to FIG. 8A, at block 802, cameras and depth sensors of a user device (e.g., 106) may be activated for passive capturing of objects (e.g., 104) in a virtual environment. At block 804, a viewport of the user device 106 may be monitored to detect the objects 104. At block 806, the system 110 may determine if an object 104 is detected. If the object 104 is not detected, the viewport may continue to monitor (e.g., block 804). At block 808, if the object 104 is detected, the system 110 may determine if the object 104 is previously captured by the system 110 during a previous capture session. Blocks 802-806 may be performed using computer vision techniques, which may involve the steps of image acquisition, pre-processing (e.g., noise reduction), feature extraction, detection/segmentation, image recognition, image registration, image verification, and/or decision making.

Referring to FIG. 8B, at block 810, if the object 104 has not been captured previously captured (from block 808), an automated capture session (e.g., photogrammetry session) may be initiated. At block 812, multiple angles and depths of the object 104 may be captured. In some examples, at block 814, if the object 104 has been previously captured (from block 808), a previous 3D model reference may be retrieved from a database 210.

At block 816, the captured data may be processed to create a 3D model. At block 818, the system 110 may determine if the 3D model of the object 104 is completely captured. At block 820, if the object 104 is completely captured, the detected object 104 is marked as complete. At block 822, if the 3D model is incomplete, the system 110 may determine if the object 104 is in the viewport of the user device 106. At block 824, if the object 104 is not in the viewport of the user device 106, the detected object 104 may be marked as incomplete. If the object 104 is in the viewport of the user device 106, the system 110 may continue to capture multiple angles and depths of the object 104 (e.g., continue from block 812).

It will be appreciated that the blocks shown in FIG. 8 are merely illustrative. Other suitable blocks may be used, if desired. Moreover, the blocks of FIG. 8 may be performed in any order and may include additional operations.

Figure 9A:
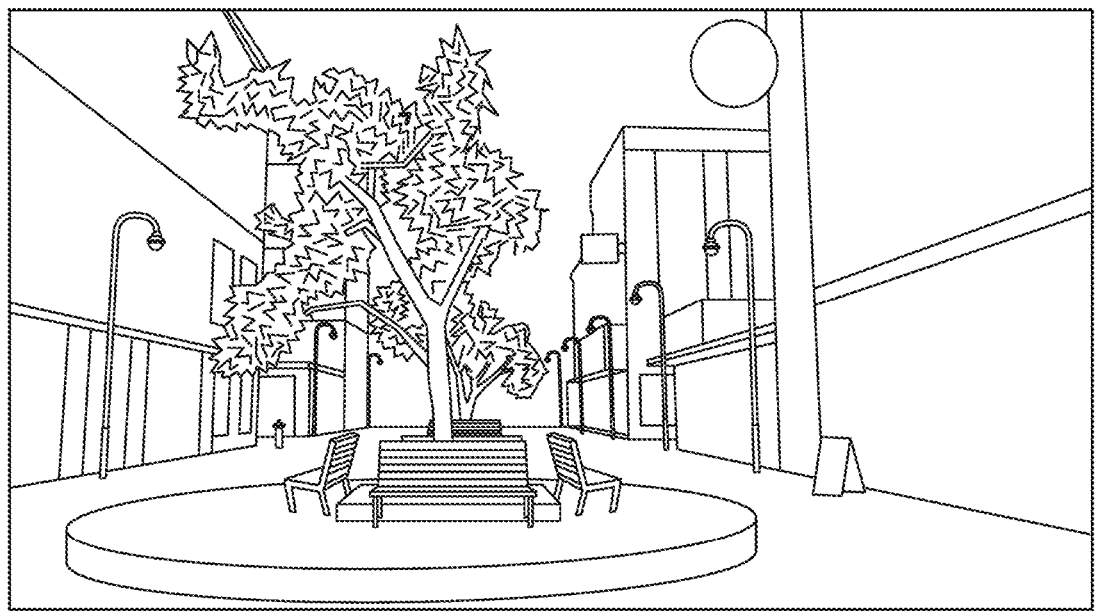
FIGS. 9A-9C illustrate example representations of physical environments for automated capturing of objects, in accordance with some examples of the present disclosure.
Figure 9B:
Figure 9C:

FIGS. 9A-9C illustrate example representations (900A, 900B, 900C) for automated capturing of objects, in accordance with examples of the present disclosure.

Referring to FIG. 9A, the example representation 900A depicts a physical environment of objects selected to create a digital twin of the physical environment in a virtual environment in an automated manner by a system (e.g., 110). A system (e.g., system 110), as disclosed herein, enables an object to be selected for 3D capture from within a virtual environment, to efficiently create scans of the selected object when the object may not be the area of focus within the virtual environment. Shown in FIG. 9A is one perspective as a user walks down the street depicted.

Referring to FIG. 9B, the example representation 900B depicts a physical environment of highlighted objects. In some examples, a user (e.g., 108) may encounter objects that the system 110 may have previously captured. In some examples, a highlight or any other UI element may be applied to an object to indicate that the object has been completely captured by the system 110 from all angles and depths. The system 110 performs passive scanning and 3D object generation in an efficient manner by managing the computational requirements resulting in lower heat generation and reduced battery drain. Shown in FIG. 9B is a alternative angle of the street shown in FIG. 9A. In particular, a plurality of objects are highlighted, some of the same objects are highlighted in FIG. 9B as that are in FIG. 9A, but additional objects are now highlighted as they have become visible as the user 108 progresses through the environment. In some examples, these objects may already be scanned, or a scan may be initiated in this moment, as is described in more detail below.

Referring to FIG. 9C, the example representation 900C depicts segmented areas of a physical environment. In particular, system 110 can identify the environment and areas in the environment, as shown in the highlighted portions of FIG. 9C. In this way, system 110 can detect objects (such as those depicted in FIGS. 9A and 9B) such as shown signs, or park benches, by using, for example, computer vision algorithms that analyze images or video feeds from the XR headset to recognize and classify objects. This may involve machine learning techniques, such as neural networks, for object detection and identification, as described in the present disclosure. In addition, in some examples, XR headsets can share spatial mapping information among multiple devices in a shared physical environment. This collaborative mapping approach improves the accuracy of object detection and tracking in the highlighted areas.

In some examples, the system 110 may automatically capture and store images external to a selected object which may be used to assist generative AI in a photogrammetry process such as, but not limited to, light sources, ambient light, time-of-day, and the like. In some examples, the user 108 may allow sharing of captured objects to be used by other users to fill details and features of 3D models who may have encountered the object from their respective user devices. For example, the user 108 may allow automatic capture when on a public street or store and may disable the automatic capture when at home.

As described above with reference to FIG. 1C, in some examples, the device may initiate an initial scan, prior to initiating a passive scan. One advantage of the initial scan is the optimization of resources. By evaluating the scene or object before initiating a full scanning process, the device avoids expending computational power and storage capacity on irrelevant subjects. Unnecessary scans often result in a surplus of data that requires processing. The initial scan decision minimizes processing overhead by preventing the commencement of a significant passive scanning process unless the observed object or environment meets predefined criteria; such as, for example, available resources, object recognition, user input, predefined criteria, resource allocation considerations, user preferences, real-time feedback mechanisms, and integration with external data sources.

Figure 10A:
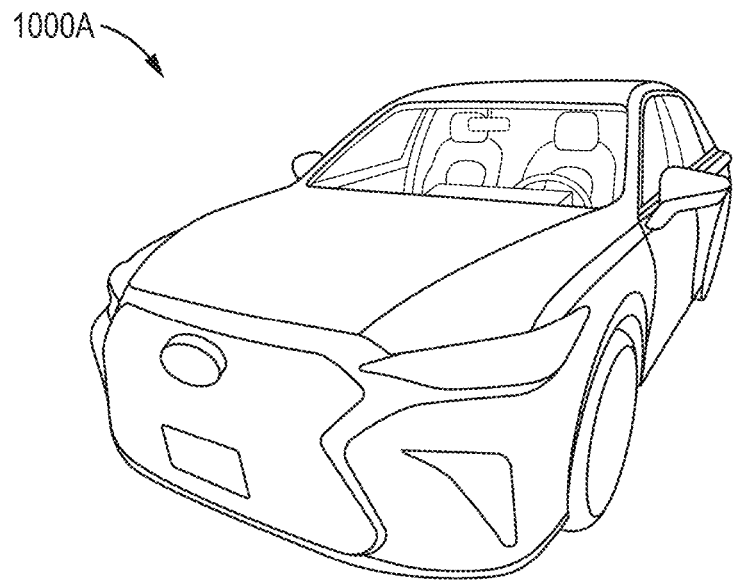
FIGS. 10A and 10B illustrate example representations for creation of alternate versions of an object, in accordance with some examples of the present disclosure.
Figure 10B:
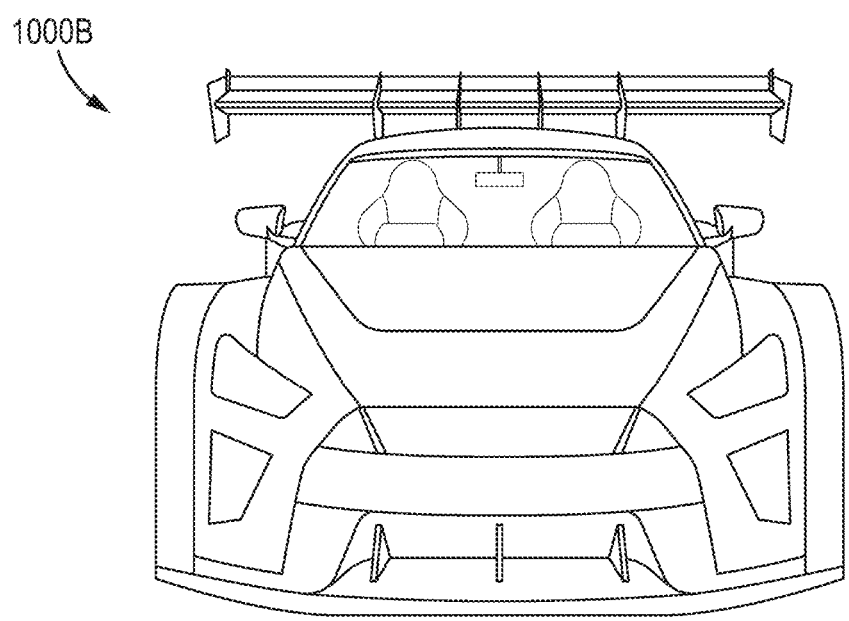

FIGS. 10A and 10B illustrate example representations (1000A, 1000B) for the creation of alternate versions of an object, in accordance with examples of the present disclosure.

Referring to FIG. 10A, the example representation 1000A depicts a 3D representation of a car created by a system 110. Referring to FIG. 10B, the example representation 1000B depicts an alternate version of the 3D representation of the car. The system 110 may create alternate versions of the car (e.g., previously captured) based on user preferences. For example, if user 108 likes modified cars, and has initiated the passive capture of a particular type of car, system 110 may generate an alternate version of the car with a modified body kit, including for example, a rear wing, e.g., as shown in FIG. 10B.

It should be understood that features or objects depicted in the figures are illustrative and may include other features or objects within the scope of the present disclosure.

FIG. 11 illustrates an example user device architecture 1100 (e.g., XR device), in accordance with examples of the present disclosure.

Referring to FIG. 11, a user device 1106 (or 106) comprises transceiver circuitry 1108, control circuitry (or processing circuitry) 1110, and a display device 1112. The user device 1106 may communicate with an additional user device 1102, such as a home gate way, smartphone, or other smart devices. In some examples, the transceiver circuitry 1108 is configured to receive a selection of an object to be passively captured in a physical environment.

In some examples, the control circuitry 1110 is coupled to the transceiver circuitry 1108. In some examples, the control circuitry 1110 is adapted to detect a presence of the selected object in the physical environment and initiate a 3D capture session. The control circuitry 1110 may generate a 3D model of at least a portion of the object in a virtual environment based on capturing scan data corresponding to the object.

In some examples, the transceiver circuitry 1108 communicates with a second user device 1102 via communication link 1104. The communication link 1104 between the transceiver circuitry 1108 and the second user device 1102 may comprise a physical connection, facilitated by an input port such as a 3.5 mm jack, RCA jack, Universal Serial Bus (USB) port, Ethernet port, or any other suitable connection for communicating over a wired connection or may comprise a wireless connection via Bluetooth, Wireless-Fidelity (Wi-Fi), WiMAX, Zigbee, Global System for Mobile communication (GSM), Universal Mobile Telecommunications System (UTMS), Code Division Multiple Access (CDMA), Time Division Multiple Access (TDMA), 3G, 4G, 4G Long-Term Evolution (LTE), 5G, or other wireless transmissions as described by the relevant 802.11 wireless communication protocols.

In some examples, the display device 1112 may display the generated 3D model.

Figure 12:
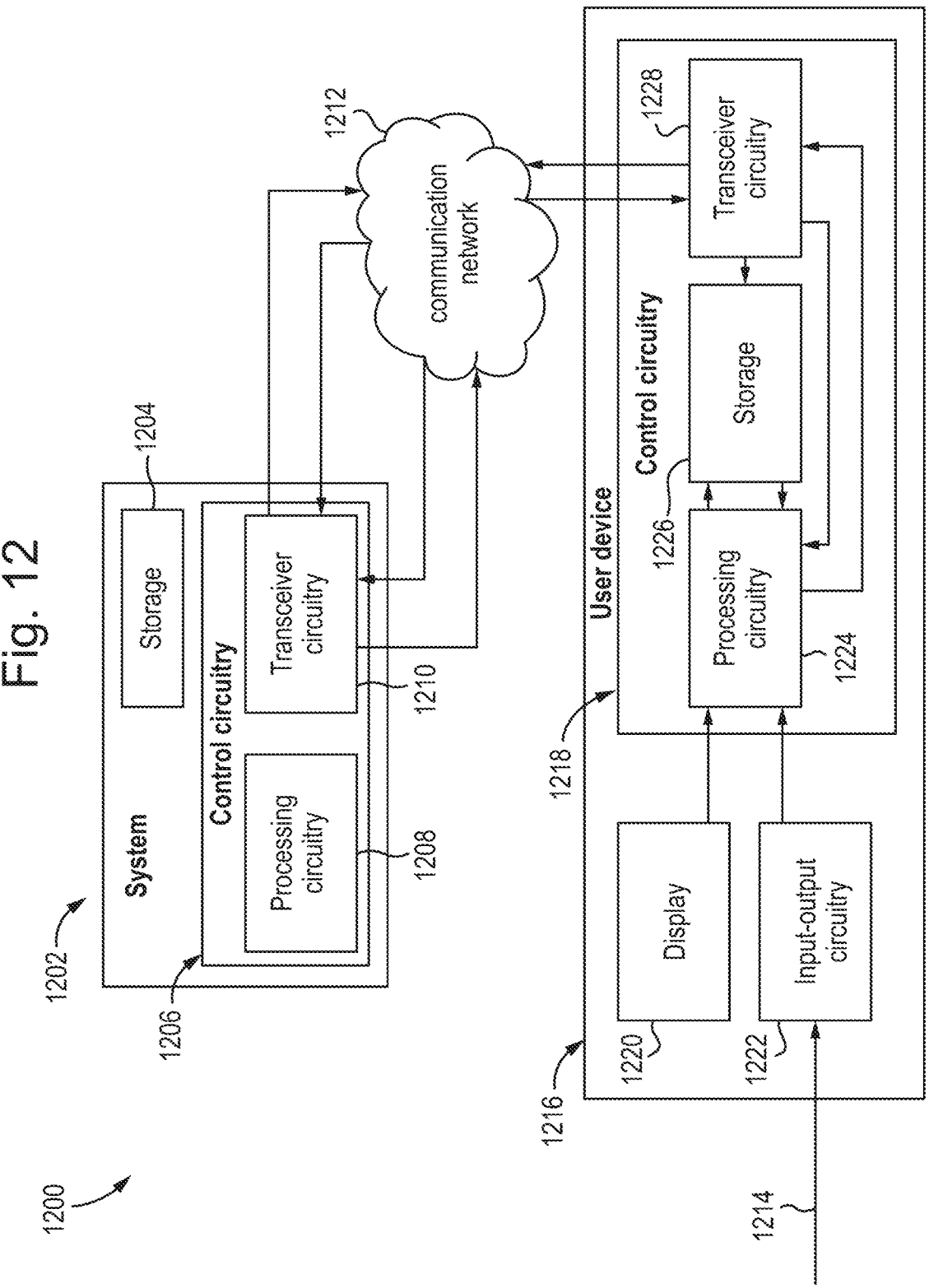
FIG. 12 is a block diagram representing devices, components of each device, and data flow therebetween, in accordance with some examples of the present disclosure.

FIG. 12 illustrates a block diagram 1200 representing devices, components of each device, and data flow therebetween, in accordance with examples of the present disclosure.

The block diagram 1200 is shown to include a user device 1216, a system 1202, and a communication network 1212. It is understood that while a single instance of a component may be shown and described relative to FIG. 12, additional instances of the component may be employed. For example, the system 1202 may include or may be incorporated in, more than one server. Similarly, the communication network 1212 may include or may be incorporated in, more than one communication network. The system 1202 is shown communicatively coupled to the user device 1216 through the communication network 1212. While not shown in FIG. 12, the system 1202 may be directly communicatively coupled to the user device 1216, for example, in a system absent or bypassing the communication network 1212.

In some examples, a selection of an object from a plurality of objects in a physical environment is made by a user via a user device.

The communication network 1212 may comprise one or more network systems, such as, without limitation, an internet, local area network (LAN), Wi-Fi, or other network systems suitable for audio processing applications. In some examples, the block diagram 1200 excludes the system 1202, and functionality that would otherwise be implemented by the system 1202 is instead implemented by other components of the block diagram 1200, such as one or more components of the communication network 1212. In still other examples, the system 1202 works in conjunction with one or more components of the communication network 1212 to implement certain functionalities described herein in a distributed or cooperative manner. Similarly, in some examples, the block diagram 1200 excludes the user device 1216, and functionality that would otherwise be implemented by the user device 1216 is instead implemented by other components of the block diagram 1200, such as one or more components of the communication network 1212 or the system 1202 or a combination thereof. In still other examples, the user device 1216 works in conjunction with one or more components of the communication network 1212 or the system 1202 to implement certain functionality described herein in a distributed or cooperative manner.

Referring to FIG. 12, the user device 1216 includes control circuitry 1218, display 1220, and input-output circuitry 1222. The control circuitry 1218 in turn includes transceiver circuitry 1228, storage 1226, and processing circuitry 1224.

The system 1202 includes control circuitry 1206 and storage 1204. Each of the storages 1204 and 1226 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, Blu-Ray disc (BD) recorders, Blu-Ray 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each storage 1204, 1226 may be used to store various types of objects, user preferences, 3D models, or other types of data. The nonvolatile memory may also be used (e.g., to launch a boot-up routine and other instructions). Cloud-based storage may be used to supplement storages 1202, 1226 or instead of storages 1202, 1226.

In some examples, control circuitry 1206 and/or 1218 executes instructions for an application stored on the memory (e.g., storage 1204 and/or storage 1226). Specifically, control circuitry 1206 and/or 1218 may be instructed by the application to perform the functions discussed herein. In some implementations, any action performed by control circuitry 1206 and/or 1218 may be based on instructions received from the application. For example, the application may be implemented as software or a set of executable instructions that may be stored on storage 1204 and/or 1226 and executed by control circuitry 1206 and/or 1218. In some examples, the application may be a client/server application, where only a client application resides on user device 1216, and a server application resides on system 1202.

The application may be implemented using any suitable architecture. For example, it may be a stand-alone application wholly implemented on user device 1216. In such an approach, instructions for the application are stored locally (e.g., in storage 1226), and data for use by the application is downloaded periodically (e.g., from an out-of-band feed, from an Internet resource, or using another suitable approach). The control circuitry 1218 may retrieve instructions for the application from storage 1226 and process the instructions to perform the functionality described herein. Based on the processed instructions, control circuitry 1218 may determine a type of action to perform in response to input received from the input/output path (or input-output circuitry) 1222 or the communication network 1212. For example, in response to a maximum network bandwidth, control circuitry 1218 may perform the steps of processes relative to various examples discussed herein.

In client/server-based examples, control circuitry 1218 may include communication circuitry suitable for communicating with an application server (e.g., system 1202) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 1212). In another example of a client/server-based application, control circuitry 1218 runs a web browser that interprets web pages provided by a remote server (e.g., system 1202). For example, the remote server may store the instructions for the application in a storage device. The remote server may process the stored instructions using circuitry (e.g., control circuitry 1218) and/or generate displays. The user device 1216 may receive the displays generated by the remote server and may display the content of the displays locally via display 1220. This way, the processing of the instructions is performed remotely (e.g., by system 1202) while the resulting displays, such as the display windows described elsewhere herein, are provided locally on the user device 1216. The user device 1216 may receive inputs from the user via input circuitry 1222 and transmit those inputs to the remote server for processing and generating the corresponding displays. Alternatively, the user device 1216 may receive inputs from the user via input circuitry 1222 and process and display the received inputs locally, by control circuitry 1218 and display 1220, respectively.

The system 1202 and user device 1216 may transmit and receive data such as via the communication network 1212. The control circuitry 1206, 1218 may send and receive commands, requests, and other suitable data through communication network 1212 using transceiver circuitry 1210, 1228, respectively. The control circuitry 1206, 1218 may communicate directly with each other using transceiver circuitry 1210, 1228, respectively, avoiding communication network 1212.

The control circuitry 1206 and/or 1218 may be based on any suitable processing circuitry such as processing circuitry 1208 and/or 1224, respectively. As referred to herein, processing circuitry 1208 and/or 1224 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry 1208 and/or 1224 may be distributed across multiple separate processors, for example, multiple of the same type of processors (e.g., two Intel Core i9 processors) or multiple different processors (e.g., an Intel Core i7 processor and an Intel Core i9 processor).

The user device 1216 receives a user input 1214 at input circuitry 1222. For example, user device 1216 may receive a selection of an object by a gesture like a user swipe or user touch, as previously discussed.

User input 1214 may be received from a user selection-capturing interface that is separate from user device 1216, such as a remote-control device, trackpad, or any other suitable user movement sensitive or capture devices, or as part of device 1216, such as a touchscreen of display 1220. Transmission of user input 1214 to user device 1216 may be accomplished using a wired connection, such as an audio cable, USB cable, Ethernet cable, or the like attached to a corresponding input port at a local device, or may be accomplished using a wireless connection, such as Bluetooth, Wi-Fi, WiMAX, Zigbee, GSM, UTMS, CDMA, TDMA, 3G, 4G, 4G LTE, 5G, or any other suitable wireless transmission protocol. Input circuitry 1222 may comprise a physical input port such as a 3.5 mm audio jack, RCA audio jack, USB port, Ethernet port, or any other suitable connection for receiving audio over a wired connection or may comprise a wireless receiver configured to receive data via Bluetooth, Wi-Fi, WiMAX, Zigbee, GSM, UTMS, CDMA, TDMA, 3G, 4G, 4G LTE, 5G, or other wireless transmission protocols.

Processing circuitry 1224 may receive input 1214 from input circuit 1222. Processing circuitry 1224 may convert or translate the received user input 1214 that may be in the form of gestures or movement to digital signals. In some examples, input circuit 1222 performs the translation to digital signals. In some examples, processing circuitry 1224 (or processing circuitry 1208, as the case may be) carries out disclosed processes and methods.

In some examples, the methods described herein may be performed using the systems described herein. In addition, it is contemplated that the methods described herein may be performed using systems different than the systems described herein. Moreover, the systems described herein may perform the methods described herein and may perform or execute instructions stored in a non-transitory computer-readable storage medium (CRSM). The CRSM may comprise any electronic, magnetic, optical, or other physical storage device that stores executable instructions. The instructions may comprise instructions to cause a processor (such as 202) to perform or control performance of operations of the proposed methods. It is also contemplated that the systems described herein may perform functions or execute instructions other than those described in relation to the methods and CRSMs described herein.

Furthermore, the CRSMs described herein may store instructions corresponding to the methods described herein and may store instructions which may be performed or executed by the systems described herein. Furthermore, it is contemplated that the CRSMs described herein may store instructions different than those corresponding to the methods described herein and may store instructions which may be performed by systems other than the systems described herein.

The methods, systems, and CRSMs described herein may include the features or perform the functions described herein in association with any one or more of the other methods, systems, and CRSMs described herein.

In some examples, the method or methods described above may be executed or carried out by a computing system including a tangible computer-readable storage medium, also described herein as a storage machine, that holds machine-readable instructions executable by a logic machine (e.g., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that a certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real-time. It should also be noted that the systems and/or methods described above may be applied to, or used in accordance with, other systems and/or methods.

All the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent, or similar purpose unless expressly stated otherwise. Thus, unless expressly stated otherwise, each feature disclosed is one example only of a generic series of equivalent or similar features.

The invention is not restricted to the details of any foregoing examples. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing examples, but also any examples which fall within the scope of the claims.

The reader's attention is directed to all papers and documents which are filed concurrently with or previous to this specification in connection with this application and which are open to public inspection with this specification, and the contents of all such papers and documents are incorporated herein by reference.

The following illustrative and non-limiting examples that can be combined with one another.

Example 1 comprises a method for passively capturing an object in a virtual environment, the method comprising: detecting, by a control circuitry, from within the virtual environment, a selection of the object of a plurality of objects to be passively captured in a physical environment using a user device; detecting, by the control circuitry, from within the virtual environment, a presence of the object in the physical environment based on the selection; in response to the detection of the presence of the object, executing, by the control circuitry, at least one operation, the at least one operation comprising initiating a three dimensional, 3D, capture session; in response to the execution of the at least one operation, capturing, by the control circuitry, scan data corresponding to the object while the object is in a viewport of the user device, wherein the capturing of the scan data is performed as a background process in the user device; storing, by the control circuitry, the scan data in a database; and generating, by the control circuitry, a 3D model of at least a portion of the object in the virtual environment based on the capturing.

Example 2 comprises determining, by the control circuitry, availability of past scan data for the object, the past scan data being associated with a previous capture session of the object in the virtual environment; and in response to the determination of the availability of the past scan data, the at least one operation further comprising retrieving a previous 3D model for the object from the database.

Example 3 comprises, in response to detecting, by the control circuitry, the presence of the object, displaying, by the control circuitry, an assistive user interface element around the object on the viewport of the user device to capture a plurality of angles of the object in a 3D space.

Example 4 comprises determining, by the control circuitry, completion status data for the generation of the 3D model; generating, by the control circuitry, an overlay comprising the 3D model on the object based on the completion status data; and displaying, by the control circuitry, the overlay on the viewport of the user device.

Example 5 comprises the overlay comprising the 3D model being aligned to an orientation and a location of the object in the physical environment.

Example 6 comprises displaying, by the control circuitry, within the virtual environment, the 3D model adjacent to the object in the physical environment.

Example 7 comprises applying, by the control circuitry, spatial segmentation on the scan data corresponding to the object; identifying, by the control circuitry, a region of interest associated with the object based on the spatial segmentation; and storing, by the control circuitry, one or more segmentations of the region of interest in the database.

Example 8 comprises highlighting, by the control circuitry, the 3D model based on a set of user preferences.

Example 9 comprises receiving, by the control circuitry, an indication of priority for capturing each of the plurality of objects from the user via the user device; and capturing, by the control circuitry, said each of the plurality of objects based on the indication of priority.

Example 10 comprises generating, by the control circuitry, a digital twin of the physical environment including the plurality of objects in the virtual environment.

Example 11 comprises tracking, by the control circuitry, a motion of the object in the physical environment; and capturing, by the control circuitry, the scan data corresponding to the object based on a speed of the motion of the object, wherein the scan data is captured based on the speed of the motion being within a pre-defined threshold.

Example 12 comprises generating, by the control circuitry, reward data for the user to facilitate capturing of the plurality of objects.

Example 13 comprises transmitting, by the control circuitry, the scan data corresponding to the object to a server, wherein the database is located on the server; receiving, by the control circuitry, a set of features corresponding to the object from the server; and generating, by the control circuitry, the 3D model based on the set of features.

Example 14 comprises extracting, by the control circuitry, a set of features corresponding to the object based on the capturing of the scan data; and generating, by the control circuitry, the 3D model based on the set of features.

Example 15 comprises evaluating, by the control circuitry, one or more differences between the previous 3D model and the scan data corresponding to the object captured during the 3D capture session; and updating, by the control circuitry, a set of features corresponding to the object based on the one or more differences.

Example 16 comprises detecting, by the control circuitry, one or more objects of the plurality of objects similar to the detected object in the physical environment based on the set of features; and capturing, by the control circuitry, the one or more similar objects based on a set of user preferences.

Example 17 comprises a method for capturing one or more objects in a virtual environment, the method comprising: receiving, by a control circuitry, media data from a user via a user device; determining, by the control circuitry, the one or more objects from the media data based on a frequency of occurrence of the one or more objects in the media data; generating, by the control circuitry, a priority for scanning of the one or more objects based on the frequency of occurrence; detecting, by the control circuitry, from within the virtual environment, a presence of the one or more objects in a physical environment via the user device; in response to the detection, initiating, by the control circuitry, a three-dimensional, 3D, capture session; capturing, by the control circuitry, scan data corresponding to the one or more objects during the 3D capture session based on the priority, while the one or more objects are within a viewport of the user device, wherein the capturing of the scan data is performed as a background process in the user device; and generating, by the control circuitry, a 3D model of at least a portion of the one or more objects in the virtual environment based on the capturing.

Example 18 comprises, in response to detecting the presence of the one or more objects, displaying an assistive user interface element around the one or more objects on the viewport of the user device to capture a plurality of angles of the one or more objects in a 3D space.

Example 19 comprises determining, by the control circuitry, completion status data for the generation of the 3D model; generating, by the control circuitry, an overlay comprising the 3D model on the one or more objects based on the completion status data; and displaying, by the control circuitry, the overlay on the viewport of the user device.

Example 20 comprises highlighting, by the control circuitry, the 3D model based on a set of user preferences.

Example 21 comprises generating, by the control circuitry, a digital twin of the physical environment including the one or more objects in the virtual environment.

Example 22 comprises tracking, by the control circuitry, a motion of the one or more objects in the physical environment; and capturing, by the control circuitry, the scan data corresponding to the one or more objects based on a speed of the motion of the one or more objects, wherein the scan data is captured based on the speed of the motion being within a pre-defined threshold.

Example 23 comprises detecting, by the control circuitry, external data corresponding to the one or more objects in the physical environment based on a set of features of the one or more objects; and capturing, by the control circuitry, the external data based on a set of user preferences.

The invention claimed is:

1. A method for collaboratively scanning an environment, the method comprising:
receiving first geometric and texture scan data of an environment captured from a first user device associated with a first user profile as a background operation of the first user device;
receiving second geometric and texture scan data of the environment captured from a second user device associated with a second user profile as a background operation of the second user device;
storing the first and second scan data in a database;
generating a 3D map of the environment by extracting one or more features from the first and second scan data;
determining a portion of the 3D map created with the features extracted from the first user device and rewarding the first user profile a portion of a reward based on the portion of the 3D map created with the features extracted from the first user device; and
determining a portion of the 3D map created with the features extracted from the second user device and rewarding the second user profile a portion of a reward quantitatively calculated based on the portion of the 3D map created with the features extracted from the second user device.

2. The method of claim 1, further comprising:
detecting one or more objects from the scan data based on a frequency of occurrence of the one or more objects in the scan data;
generating a priority for scanning the one or more objects based on the frequency of occurrence; and
wherein the portion of the reward is further based on the priority of the one or more objects.

3. The method of claim 2, further comprising:
instructing the first and second user devices to capture scan data as a background operation corresponding to the priority of the one or more objects, while the one or more objects are within a viewport of the user device.

4. The method of claim 1, further comprising:
displaying an assistive user interface element around one or more objects within the viewport of the first or second user device to aid in the capture of additional scan data of the one or more objects.

5. The method of claim 1, further comprising:
determining completion status data for the generation of the 3D map;
generating an overlay comprising the 3D map on the environment; and
displaying the overlay within the viewport of the user device.

6. The method of claim 1, further comprising, generating a digital twin of the physical environment based on the 3D map and scan data.

7. The method of claim 6, further comprising:
receiving a request for navigation from a first point of interest to a second point of interest in the environment;
generating a navigation route in the digital twin of the physical environment; and
providing navigation instructions to a user device from the first point of interest to the second point of interest.

8. The method of claim 7, further comprising:
updating the real-time navigation instruction to the user device based on the movement of the user device through the digital twin environment.

9. The method of claim 1, further comprising:
applying spatial segmentation on the scan data corresponding to the environment;
identifying a portion of the environment based on the spatial segmentation of the environment; and
receiving scan data corresponding to the portion of the environment;
wherein the 3D map of the environment is updated based on the scan data corresponding to the portion.

10. The method of claim 1, further comprising:
creating at least one classifier algorithm based on the scan data of the environment; and using the classifier algorithm to detect a presence of a physical object in the environment.

11. A system for collaboratively scanning an environment, the system comprising control circuitry configured to:
receive first geometric and texture scan data of an environment captured from a first user device as a background operation of the first user device;
receive second geometric and texture scan data of the environment captured from a second user device as a background operation of the second user device;
store the first and second scan data in a database;
generate a 3D map of the environment by extracting one or more features from the first and second scan data;
determine a portion of the 3D map created with the features extracted from the first user device and rewarding the first user device a portion of a reward based on the portion of the 3D map created with the features extracted from the first user device; and determine a portion of the 3D map created with the features extracted from the second user device and rewarding the second user device a portion of a reward quantitatively calculated based on the portion of the 3D map created with the features extracted from the second user device.

12. The system of claim 11, the control circuitry configured to:

determine one or more objects from the scan data based on a frequency of occurrence of the one or more objects in the scan data;

generate a priority for scanning the one or more objects based on the frequency of occurrence; and wherein the portion of the reward is further based on the priority of the one or more objects.

13. The system of claim 12, the control circuitry configured to:

instruct the first and second user devices to capture scan data as a background operation corresponding to the priority of the one or more objects, while the one or more objects are within a viewport of the user device.

14. The system of claim 11, the control circuitry configured to:

display an assistive user interface element around one or more objects on the viewport of the first or second user device to aid in the capture of additional scan data of the one or more objects.

15. The system of claim 11, the control circuitry configured to:

determine completion status data for the generation of the 3D map;

generate an overlay comprising the 3D map on the environment; and display the overlay on the viewport of the user device.

16. The system of claim 11, the control circuitry configured to:

generate a digital twin of the physical environment based on the 3D map and scan data.

17. The system of claim 16, the control circuitry configured to:

receive a request for navigation from a first point of interest to a second point of interest in the environment;

generate a navigation route in the digital twin of the physical environment; and provide navigation instructions to a user device from the first point of interest to the second point of interest.

18. The system of claim 17, the control circuitry configured to:

update the real-time navigation instruction to the user device based on the movement of the user device through the digital twin environment.

19. The system of claim 11, the control circuitry configured to:

apply spatial segmentation on the scan data corresponding to the environment;

identify a portion of the environment based on the spatial segmentation of the environment; and receive scan data corresponding to the portion of the environment;

wherein the 3D map of the environment is updated based on the scan data corresponding to the portion.

20. The system of claim 11, the control circuitry configured to:

create at least one classifier algorithm based on the scan data of the environment; and use the classifier algorithm to detect a presence of a physical object in the environment.

* * * * *